(12) United States Patent
Jagerson, Jr.

(10) Patent No.: US 10,163,242 B2
(45) Date of Patent: Dec. 25, 2018

(54) ENERGY GRID DATA PLATFORM

(71) Applicant: Gordon Todd Jagerson, Jr., Portola Valley, CA (US)

(72) Inventor: Gordon Todd Jagerson, Jr., Portola Valley, CA (US)

(73) Assignee: Gordon Todd Jagerson, Jr., Portola Valley, CA (US)

( * ) Notice: Subject to any disclaimer, the term of this patent is extended or adjusted under 35 U.S.C. 154(b) by 0 days.

(21) Appl. No.: 15/465,413

(22) Filed: Mar. 21, 2017

(65) Prior Publication Data

US 2018/0218525 A1     Aug. 2, 2018

Related U.S. Application Data

(60) Provisional application No. 62/452,822, filed on Jan. 31, 2017.

(51) Int. Cl.
*G06T 11/60* (2006.01)
*G06K 9/00* (2006.01)
(Continued)

(52) U.S. Cl.
CPC ............ *G06T 11/60* (2013.01); *G06F 17/50* (2013.01); *G06K 9/00671* (2013.01);
(Continued)

(58) Field of Classification Search
CPC ................................................. G06F 3/04842
(Continued)

(56) References Cited

U.S. PATENT DOCUMENTS 6,516,326 B1 *   2/2003   Goodrich .......... G06F 17/30566
                                                                    707/602
8,588,991 B1    11/2013   Forbes, Jr.
(Continued)

FOREIGN PATENT DOCUMENTS

WO       2017027682 A1    2/2017

OTHER PUBLICATIONS

International Search Report and Written Opinion dated May 4, 2018, for International Application No. PCT/US18/015790 of Jagerson, G. filed Jan. 29, 2018.
(Continued)

*Primary Examiner* — Javid A Amini
(74) *Attorney, Agent, or Firm* — Perkins Coie LLP

(57) ABSTRACT

Techniques are disclosed for an energy grid data platform through which information associated with an electrical grid can be accessed by one or more entities. In some embodiments, an energy grid data platform includes one or more modeling engines configured to receive data associated with an electrical grid and generate data models describing various aspects of the electrical grid. For example an electrical grid model describing the state of the electrical grid at one or more points of connection may be based at least in part on data received from sensors at the edge of the electrical grid. As another example, a physical grid model describing the physical arrangement and logical relationships between physical objects associated with the electrical grid can be generated based at least in part on received imagery data. In some embodiments, aspects of an electrical grid model and physical grid model can be combined into an operational grid model that associates real-time operating information with the certain identified physical objects associated with the electrical grid. Information based on the one or more generated models of the electrical grid can be accessed via
(Continued)

the energy grid platform as a cloud-based service, for example, via a web interface or an augmented reality display device.

30 Claims, 16 Drawing Sheets

(51) Int. Cl.
| | | |
|---|---|---|
| *G06F 17/50* | (2006.01) | |
| *G06Q 10/00* | (2012.01) | |
| *G06Q 50/06* | (2012.01) | |
| *G06F 3/0484* | (2013.01) | |
| *H04L 29/08* | (2006.01) | |

(52) U.S. Cl.
CPC ............ *G06Q 10/00* (2013.01); *G06Q 50/06* (2013.01); *G06F 3/0484* (2013.01); *H04L 67/12* (2013.01)

(58) Field of Classification Search
USPC ........................................................ 345/633
See application file for complete search history.

(56) References Cited

U.S. PATENT DOCUMENTS

| | | | |
|---|---|---|---|
| 8,818,924 B2 | 8/2014 | Wayne et al. | |
| 8,924,150 B2* | 12/2014 | Tsimhoni | G01C 21/365 340/691.1 |
| 8,963,353 B1* | 2/2015 | Ekanayake | F03D 9/255 290/43 |
| 9,014,867 B2 | 4/2015 | Divan et al. | |
| 9,710,212 B2* | 7/2017 | Castelli | G06Q 10/063 |
| 9,792,292 B1* | 10/2017 | Bynum | G06F 17/30165 |
| 2005/0030015 A1* | 2/2005 | Duncan | G01D 9/005 324/244.1 |
| 2010/0076835 A1* | 3/2010 | Silverman | G06Q 10/06 705/14.33 |
| 2010/0217550 A1* | 8/2010 | Crabtree | H02J 3/005 702/62 |
| 2011/0148922 A1* | 6/2011 | Son | G01C 21/206 345/633 |
| 2012/0029720 A1* | 2/2012 | Cherian | H02J 13/00 700/297 |
| 2012/0190455 A1* | 7/2012 | Briggs | H04L 67/38 463/42 |
| 2012/0253540 A1* | 10/2012 | Coyne | G06Q 10/00 700/297 |
| 2012/0266170 A1* | 10/2012 | Zimmerman | G06F 8/63 718/1 |
| 2012/0266209 A1* | 10/2012 | Gooding | H04L 63/20 726/1 |
| 2012/0316688 A1* | 12/2012 | Boardman | H02J 13/0079 700/291 |
| 2013/0024149 A1* | 1/2013 | Nayar | H02J 3/26 702/72 |
| 2013/0198847 A1* | 8/2013 | Sampigethaya | H04L 63/1433 726/25 |
| 2014/0233662 A1* | 8/2014 | Hansell | H04B 3/54 375/258 |
| 2015/0006141 A1* | 1/2015 | Enenkel | G06F 17/5036 703/18 |
| 2015/0100284 A1* | 4/2015 | Teravainen | G06F 17/504 703/2 |
| 2016/0259357 A1* | 9/2016 | Wepman | G05F 1/66 |
| 2016/0334447 A1* | 11/2016 | Parashar | G01R 25/00 |
| 2017/0092055 A1* | 3/2017 | Brockman | G07F 17/3225 |
| 2017/0154387 A1* | 6/2017 | Somers | G06Q 50/06 |
| 2017/0192042 A1* | 7/2017 | Micali | G01R 21/133 |
| 2017/0205781 A1* | 7/2017 | Brooks | G05B 13/045 |
| 2017/0206467 A1* | 7/2017 | Brooks | G06N 99/005 |
| 2017/0213390 A1* | 7/2017 | Ramachandran | G06T 19/006 |
| 2017/0307510 A1* | 10/2017 | Gluskin | F17D 5/00 |
| 2018/0013320 A1* | 1/2018 | Brooks | H02J 13/0006 |
| 2018/0018076 A1* | 1/2018 | Ens | G06F 3/04815 |
| 2018/0060978 A1* | 3/2018 | Forbes, Jr. | G05D 17/00 |
| 2018/0089870 A1* | 3/2018 | Billi-Duran | G06T 11/60 |
| 2018/0107691 A1* | 4/2018 | Boardman | G06F 17/30292 |

OTHER PUBLICATIONS

Lapides, P. et al. "HomeWindow: An Augmented Reality Domestic Monitor," Human-Robot Interaction (HRI), 2009 4th ACM/IEEE International Conference, New York, NY, Mar. 9, 2009, pp. 323-324.

Suzuki, L.R. et al. "Smart Building Management through Augmented Reality," IEEE International Conference on Pervasive Computing and Communication Workshops, Mar. 24, 2014, pp. 105-110.

Teixeira, J.M. et al. "Teleoperation Using Google Glass and AR.Drone for Structural Inspection," 2014 XVI Symposium on Virtual and Augmented Reality, IEEE, May 12, 2014, pp. 28-36.

Antonijevic, M. et al. "Augmented Reality for Substation Automation by Utilizing IEC 61850 Communication," 2016 39t International Convention on Information and Communication Technology, Electronics and Microelectronics (MIPRO), Croation Society MIPRO, May 30, 2016, pp. 316-320.

Li, L. et al. "Augmented Reality in IT Operation Management of Power System," 2016 13th Web Information Systems and Applications Conference (WISA), IEEE, Sep. 23, 2016, pp. 12-17.

Hill, A. "Kharma: An Open KML/HTML Architecture for Mobile Augmented Reality Applications," Mixed and Augmented Reality (ISMAR), 2010 9th IEEE International Symposium New Jersey, Oct. 13, 2010, pp. 233-234.

Lee, Y-J, et al., "Object Recognition Based Power Plant Management System in Smart Grid Using Smart Device," 16th International Conference on Advanced Communication Technology, Global IT Research Institute (GIRI), Feb. 16, 2014, pp. 1301-1305.

* cited by examiner

ENERGY GRID DATA PLATFORM

CROSS-REFERENCE TO RELATED APPLICATION(S)

This application is entitled to the benefit and/or right of priority of U.S. Provisional Application No. 62/452,822, titled, "ENERGY GRID DATA PLATFORM," filed Jan. 31, 2017, the contents of which are hereby incorporated by reference in their entirety for all purposes. This application is therefore entitled to a priority date of Jan. 31, 2017.

TECHNICAL FIELD

The present disclosure generally relates to the gathering, analysis, and distribution of data related to an electrical grid. More particularly, the present disclosure introduces a data platform through which users can access (in some cases using augmented reality) information based on data gathered in part from network-connected devices at the edge of an electrical grid.

BACKGROUND

The electrical grid provides the infrastructure for delivering energy in the form of electricity from suppliers to consumers. The electrical grid of today includes utility-managed generating stations that utilize energy sources (e.g. coal, natural gas, nuclear, solar, hydro, wind, etc.) to generate electricity, high voltage electrical transmission infrastructure (e.g. step-up transformers, power lines, etc.) to transmit the generated electrical energy over long distances, and lower voltage electrical distribution infrastructure (e.g. step-down transformers, power lines, etc.) to deliver the electricity to consumers (e.g. residential, commercial, industrial, etc.) at the edge of the grid.

BRIEF DESCRIPTION OF THE DRAWINGS

The present disclosure is illustrated by way of example, and not by way of limitation, in the figures of the accompanying drawings and in which like reference numerals refer to similar elements. The figures of the accompanying drawings depict only example embodiments of the present disclosure and are therefore not to be construed as limiting. In the drawings.

DETAILED DESCRIPTION

Overview

Figure 1:
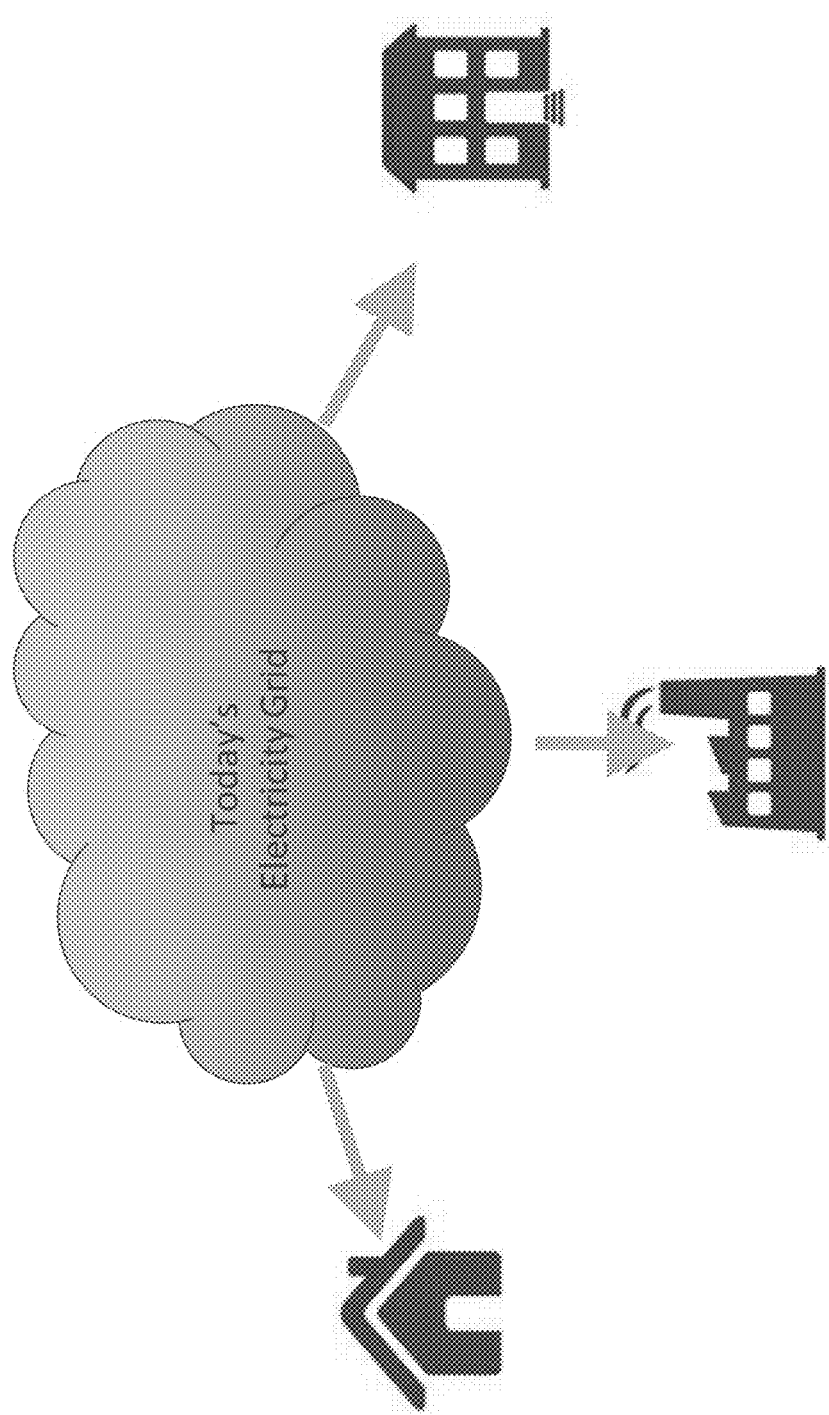
FIG. 1 shows a high level diagram illustrating the centralized nature of the electrical grid of today.
Figure 2:
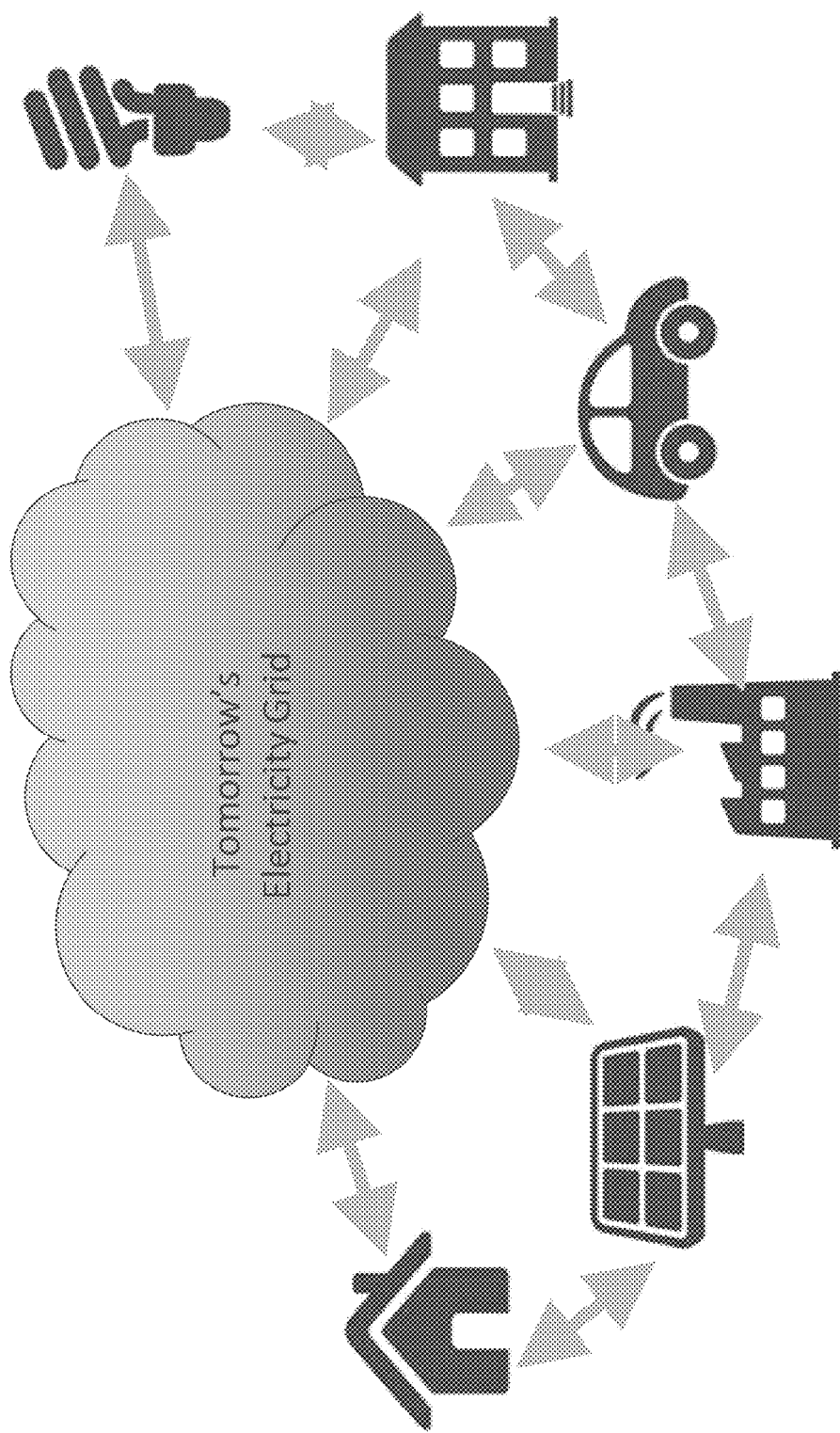
FIG. 2 shows a high level diagram illustrating the increasingly decentralized nature of the electrical grid of tomorrow.

As shown in FIG. 1, the electrical grid of today is typically unidirectional with energy supplied and delivered by utility-controlled infrastructure to utility customers. However, as shown in FIG. 2, the electrical grid is becoming increasingly more decentralized with the growth of distributed energy resources (DER) that generate, store, and manage electricity at the edge of the grid. Distributed energy resources are typically smaller power sources (e.g., in the range of 1 kW to 10 MW) located at the edge of the grid and near the loads they are designed to serve. As the number and types of DERs integrated into the grid increase, the range in sizes of DERs scale an order of magnitude up or down. Distributed energy resources can include storage facilities (e.g. lithium ion batteries, flywheels, flow batteries, thermal storage, etc.) and advanced renewable technologies (e.g. photovoltaics, wind turbines, fuel cells, etc.). Electricity generated from such resources can also be aggregated to provide power necessary to meet regular demand.

As the electrical grid becomes more decentralized, data from the many devices connected to the grid (including devices associated with DERs) can be utilized to help facilitate smarter more efficient utilization of the grid. However, much of this generated data is currently distributed and not shared amongst different entities interacting with the grid such as utilities, utility equipment vendors, energy customer equipment vendors (e.g. renewable energy asset aggregators, energy service providers, consumer equipment vendors, etc.), and energy consumers (e.g. residential, commercial, industrial, government, etc.). This creates problems of access and control of the data. For example, multiple utilities operating on the grid may use different proprietary systems for collecting data regarding activity on the grid. Entities operating at the edge of the grid such as DERs and net energy consumers are left to rely primarily on information provided by the utilities regarding the grid, however the utilities themselves have a very limited picture of the overall state of the grid at any given location and/or point in time.

Figure 3:
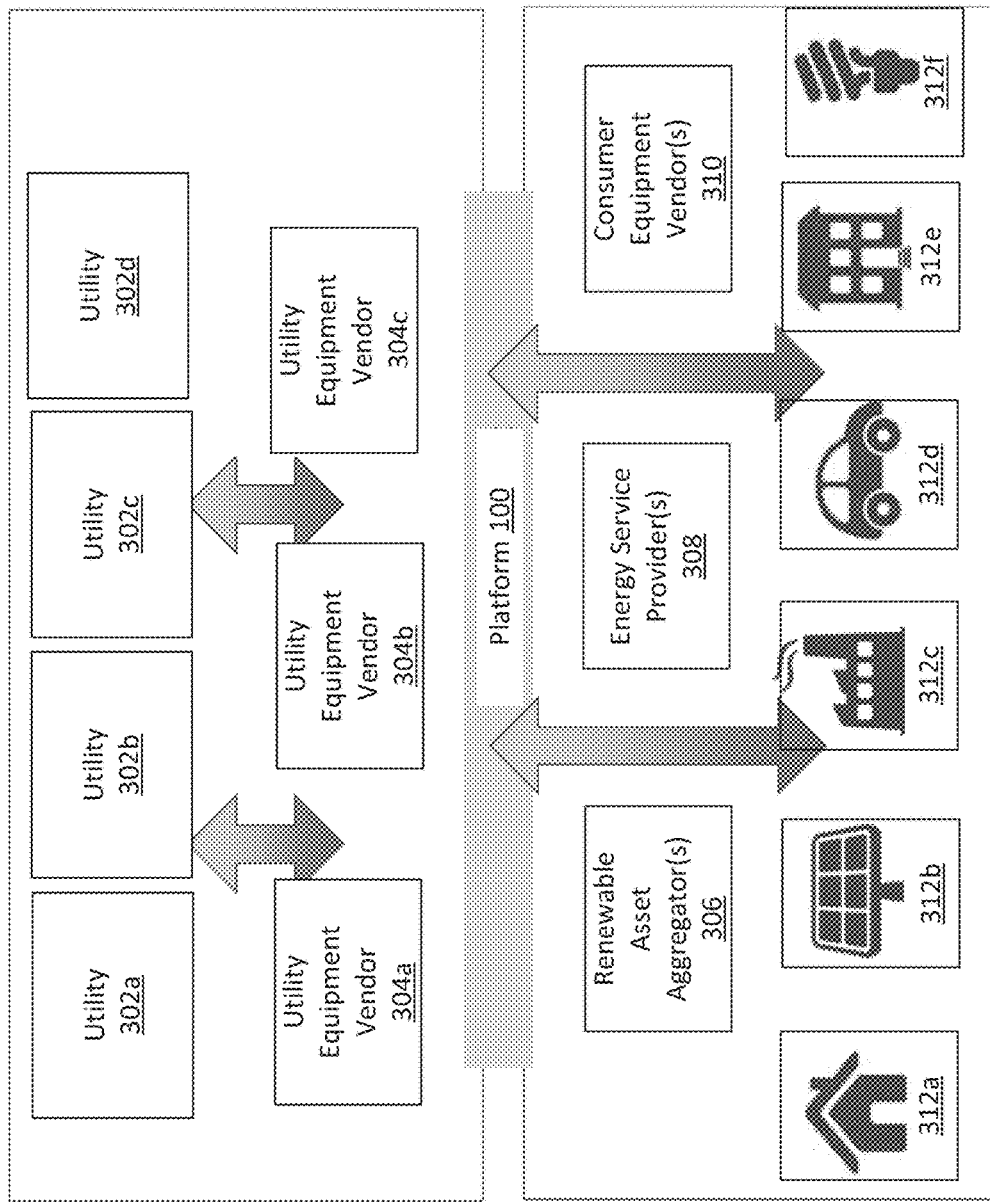
FIGS. 3-5 show several high level diagrams illustrating example flows of data between entities associated with the electrical grid and a neutral energy grid data platform.
Figure 4:
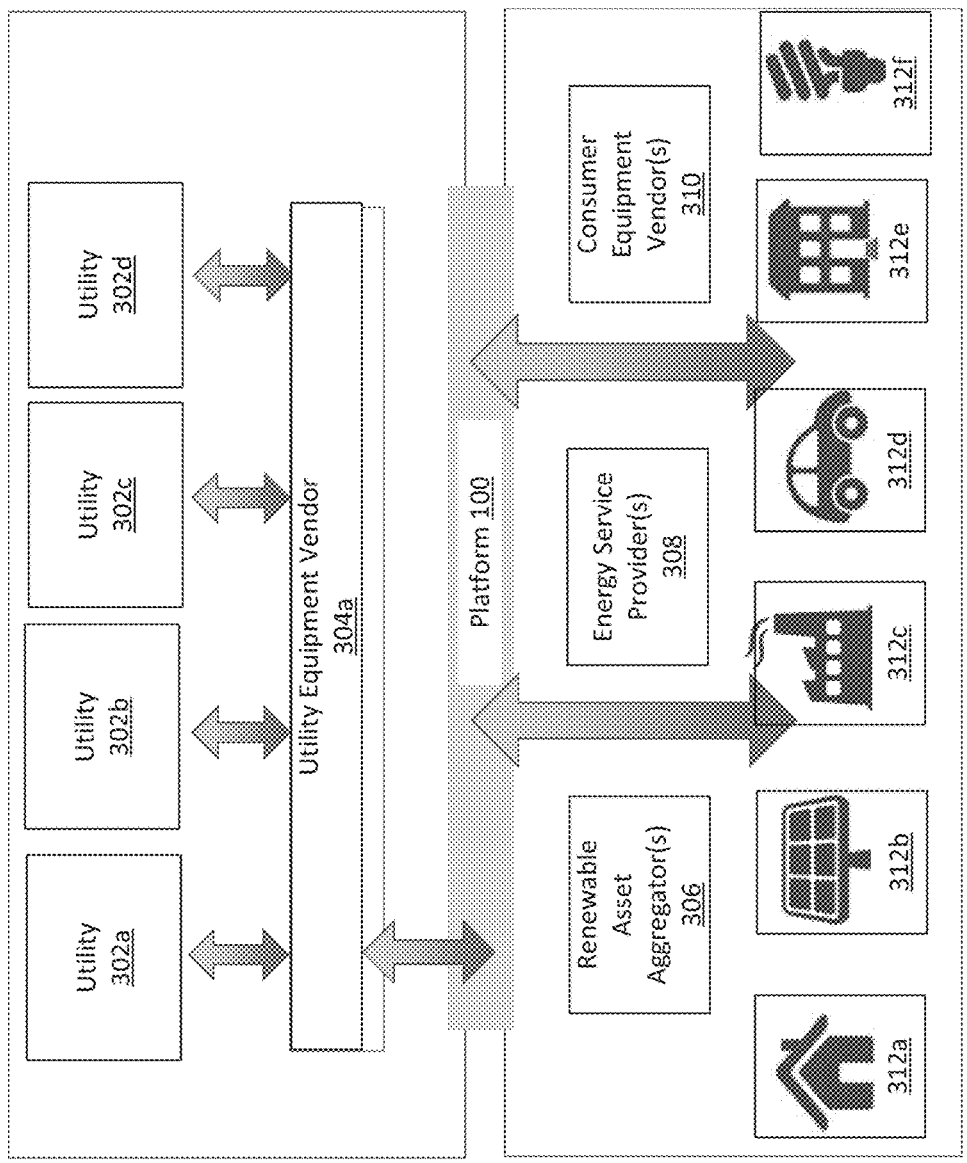
Figure 5:
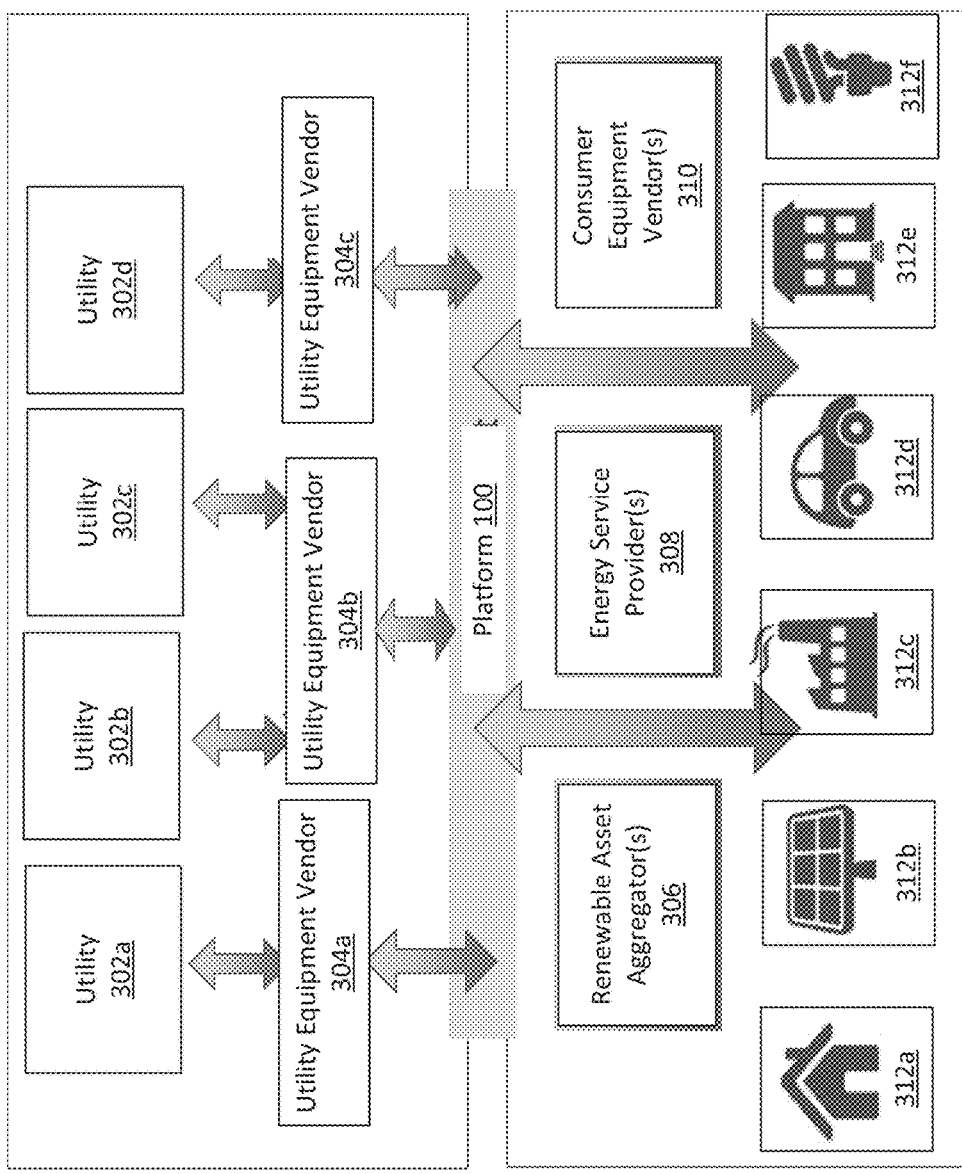

Introduced herein are techniques for implementing an energy grid data platform (herein "Platform") 100 to address the issues described above. As shown in FIG. 3, the Platform 100 can exist as a neutral platform for collecting data regarding the electrical grid from multiple sources, securely managing the data, and offering the data as a service to multiple entities interacting with the grid such as utilities 302*a-d*, utility equipment vendors 304*a-c*, renewable asset aggregators 306, energy service providers 308, consumer equipment vendors 310, and net energy consumers 312*a-f*. Aspects of a Platform 100 can be configured to services different entities. For example, as shown in FIG. 4, in some embodiments, aspects of Platform 100 can be configured to service a utility equipment vendor who then utilizes the data to provide products/services to the utilities 302*a-d*. Similarly, in some embodiments, aspects of Platform 100 can be configured to service multiple utility equipment vendors 304*a-c*, for example as shown in FIG. 5. It shall be appreciated that the example data flow schemes described with respect to FIGS. 3-5 are provided for illustrative purposes and are not to be construed as limiting. Due to the neutral nature of Platform 100, any number of entities (including those listed in FIGS. 3-5 and those not) may contribute and/or consume data available via the Platform 100 as a service.

Example System for Implementing an Energy Grid Data Platform

Figure 6:
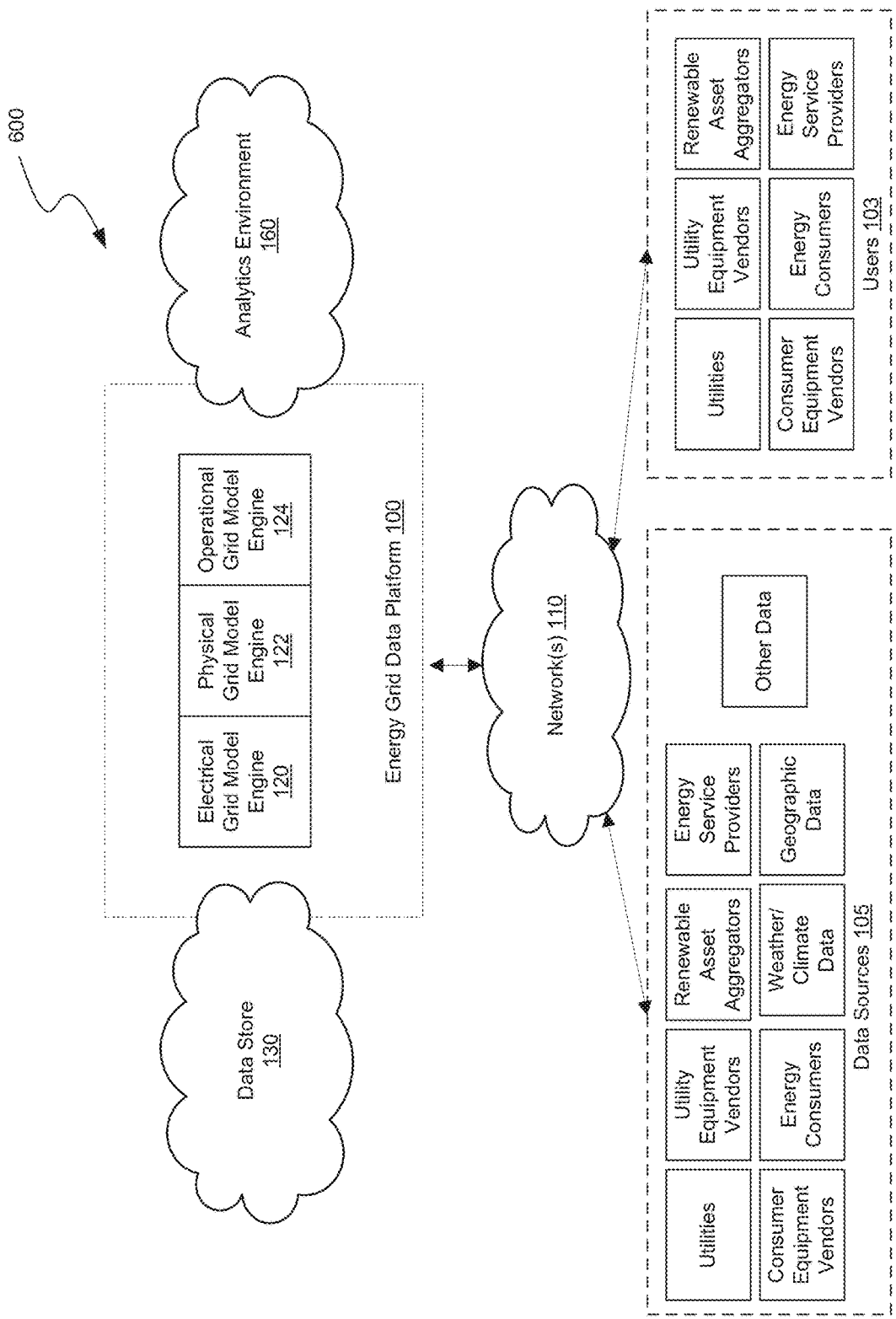
FIG. 6 shows a diagram of an example system for implementing an energy grid data platform, according to some embodiments.

FIG. 6 illustrates an example diagram of a system 600 for implementing an energy grid data platform 100, according to some embodiments. As shown in FIG. 6, users 103 may access services provided by Platform 100 via computing devices (not shown) connected to one or more networks 110. Platform 100 may include one or more grid modeling engines 120, 122, 124 configured to process data regarding an electrical grid retrieved from one or more data sources 105 to generate models of the grid for use in providing the one or more services to users 103. In some embodiments Platform 100 includes data storage facilities 130 to store data ingested from the one or more sources 105. Platform 100 can also include an analytics environment 160 through which large volumes of stored data are processed.

As mentioned, users 103 can access services offered by Platform 100 via one or more network connected computing devices. In this context, users can refer to any number of entities interacting with an electrical grid such as utilities, utility equipment vendors, renewable asset aggregators, energy service providers, consumer equipment vendors, and energy consumers (e.g. residential, commercial, industrial, government, etc.). Although not shown in FIG. 6, computing devices can include any systems and/or devices or combinations of devices/systems that are configured to establish a communication (e.g., wired, wireless, cellular, etc.) with other devices/systems (e.g. servers associated with Platform 100) for the purposes of transmission and processing of data. In some embodiments, computing devices can include displays and/or other output functionalities to present information and data exchanged between and among other devices of system 600. Such computing devices may comprise any combination of computing hardware and/or software, for example including hardware and/or software components as described with reference to FIG. 13. Some illustrative examples of computing devices include servers, desktop computers, distributed computing clusters, laptop and handheld computer, mobile phones, smart energy devices, augmented reality (AR) display devices, virtual reality (VR) display devices, etc.

The input mechanism in some computing devices may include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), various sensors (e.g. current, voltage, optical, geo-location, etc.), or any combination thereof. As will be described, in certain embodiments user may access services provided by Platform 100 via AR or VR systems. Augmented reality display devices can deliver to a user a live direct or indirect view of a physical, real-world environment whose elements are augmented (or supplemented) by computer-generated sensory input such as sound, video, graphics or GPS data. For example, data accessed from Platform 100 regarding a device connected to an electrical grid can be displayed to a user via a transparent display while the user is looking at the device in the physical environment. Examples of AR display devices that may be employed to implement certain embodiments include handheld display devices such as smart phones and tablet devices, head mounted display devices (e.g. Microsoft HoloLens™, Google Glass™), virtual retinal display devices, heads up display (HUD) devices in vehicles, etc.

FIG. 6 is a high-level conceptual diagram of an example Platform 100. It shall be understood that Platform 100 may be composed of any combination of computing hardware and software, for example including hardware and/or software components as described with reference to FIG. 13. Further, it shall be understood that Platform 100 may include components hosted at a single physical location or may include components distributed at multiple physical locations in communication with each other via, for example, network 110. It shall also be understood that Platform 100 may include fewer or more components than as shown in FIG. 6. For example, FIG. 6 illustrates an embodiment of the present disclosure in which storage and analytics may be provided by third party cloud-based systems (e.g. Amazon AWS and Google BigQuery). According to some embodiments, functionality provided by such services may be provided by a provider of Platform 100 without reliance on third-party services. Users 103 may access the functionality of Platform 100 via network 110 in a number of ways, including, but not limited to via client software instantiated on a computing device, or via a web browser instantiated on computer device. In either case, access to the functionality of Platform 100 may, in come embodiments, be provided via a graphical interface presented to users 103 at a computing device.

Platform 100 represents a cloud-based services platform through which the systems and methods described herein may be provided to users 103. According to some embodiments, Platform 100 may provide one or more cloud-based services (some provided by third-parties) using one or more engines 120, 122, 124 for generating models of the electrical grid based on data received from sources 105. The term "models" in this context may generally refer to data models or more broadly to any type of structure of organization of the received data. An illustrative example a model that may be generated by any of engines 120, 122, or 124 may include a database relating certain entities or physical objects associated with an electrical grid to operational information gathered based on data received from devices connected to the electrical grid.

As previously mentioned Platform 100 may include data storage 130 where data is stored and processed. Data stored on data storage 130 may be stored in raw form and/or in one or more databases, data stores, data warehouses, or any other data structure types. Data storage 130 may be hosted on one or more physical server machines at a single physical data center location, however more likely as shown in FIG. 6, data storage 130 may be hosted on multiple physical server machines in a distributed manner in the "cloud." Hosting of data storage 130 may be provided by the provider of platform 100 or may be provided by a third-party cloud storage provider. For example, Amazon Web Services™ offers a simple remote cloud storage service called Amazon S3™.

Data storage 130 may represent the aggregation point or staging area for the multiple data sources 105 utilized by the modeling engines of platform 100, including but not limited to data from devices connected to the grid (e.g. operated by utilities, utility equipment vendors, renewable asset aggregators, energy service providers, consumer equipment vendors, and energy consumers) as well as data from other sources such as weather and climate data and geographic data (e.g. in the form of global imaging data). Data may be pushed or pulled from the source and stored for operational use at data storage 130. It will be appreciated that such an implementation may require relatively high levels of storage capacity. Alternatively, metadata associated with the multiple source data may be stored in a key store database for quick access from the sources when needed.

Data in data storage 130 may be stored as one or more databases, data stores, data warehouses, and/or any other data structures configured to allow for the efficient definition, creation, querying, update, and administration of data. For example, according to some embodiments, data storage 130 may include databases employing a relational database architecture. Examples of relational database management systems include MySQL, Oracle Database, Microsoft SQL Server, and IBM DB2. Alternatively, data storage 130 may include databases employing a means of storage and retrieval other than the tabular relations used in relational databases. For example, data storage 130 may include NoSQL based databases that as described above may be implemented as key store databases. A NoSQL key store database storing associative array of metadata representing the source data may be preferable in this context due to the high performance and scalability which may be needed to deal with near-real time processing of queries on large-scale data sets. Examples of NoSQL databases suitable for implementation with Platform 100 include, but are not limited to, MongoDB, HBase, Cassandra, and Couch DB.

According to some embodiments, data storage 130 may implement a distributed file system for the storage, retrieval and processing of data. For example, Apache Hadoop Distributed File System (HDFS) is a file system in the Apache Hadoop framework that has the capability of storing and processing large-scale data sets across multiple machines. HDFS achieves reliability by replicating the data across multiple host data nodes. Data nodes can talk to each other to rebalance data, to move copies around, and to keep the replication of data high. Data stored in an HDFS may be accessed via an application programming interface (API) (e.g., the Java API).

Platform 100 may include one or more job engines configured to process data via a cluster of computing devices implementing a distributed file system. For example, an HDFS may employ a MapReduce engine to which client applications (e.g. operating as part of engines 120, 122, 124) may submit MapReduce jobs as part of a task to be performed by the distributed computing cluster. MapReduce generally describes a programming model for processing large-scale data sets across multiple computing nodes that comprises two steps: a map step and a reduce step. At the map step, a cluster controller may intake a problem or query associated with a large-scale data set and divide the problem or query amongst the multiple computing nodes of the cluster. The multiple computing nodes may process the data and return the answer to the cluster controller. At the reduce step the cluster controller may collect the answers from the multiple nodes and combine into a single output.

Platform may also include a large-scale data analytics environment 160 through which data stored at data store 130 may be analyzed. According to some embodiments, analytics environment 160 may be cloud-based and include data storage and one or more query/analytics engines. According to some embodiments, analytics environment 160 may be provided by the Platform 100 provider. Alternatively, the analytics environment 160 may be provided by a third party as a service such as Google BigQuery™ or Amazon Redshift™.

All of the aforementioned computing devices, including computing devices associated with users 103, any computing devices associated with Platform 100 (including data storage 130 and analytics environment 160), and computing devices associated with any of the data sources 105 may be communicatively connected to each other through one or more wired and/or wireless computer networks, for example network 110.

In general, network 110 may include any collection of distinct data networks operating wholly or partially in conjunction to provide connectivity for the computing devices associated with the system components shown in FIG. 6. Distinct network types, may include, but are not limited to, one or more of, a Local Area Network (LAN), a Wide area network (WAN), a Personal area network (PAN), a Campus area network (CAN), or a Metropolitan area network (MAN). Further, connectivity may be achieved wirelessly over any wireless network type, including but not limited to, one or more of, a Wireless Local Area Network (WLAN), or Wireless wide area network (WWAN). Communication over any of the previously listed network types may be enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1×RTT, EV-DO, and messaging protocols such as, TCP/IP, SMS, MMS, extensible messaging and presence protocol (XMPP), real time messaging protocol (RTMP), instant messaging and presence protocol (IMPP), instant messaging, USSD, and IRC. In some embodiments, communications can be secured using a secure communications protocol, such as secure sockets layer (SSL), or transport layer security (TLS).

Electrical Grid Model

As previously mentioned, in some embodiments Platform 100 can include an engine 120 for generating an electrical grid model based on received data. Generally speaking, an electrical grid model may refer to a data model describing the state of an electrical grid at any given time or describing or predicting changes in such a state over a period of time, including for example describing how the grid changes with variances from adding or subtracting elements from the grid, from changing weather conditions, or from changing consumption habits resulting from e.g. electricity rate changes or other motivators. Such a model can be updated in real-time or near real-time based on data received from devices connected to the edge of the grid, and can be run with theoretical changes to the model to generate predictions regarding changes in the model.

Figure 7:
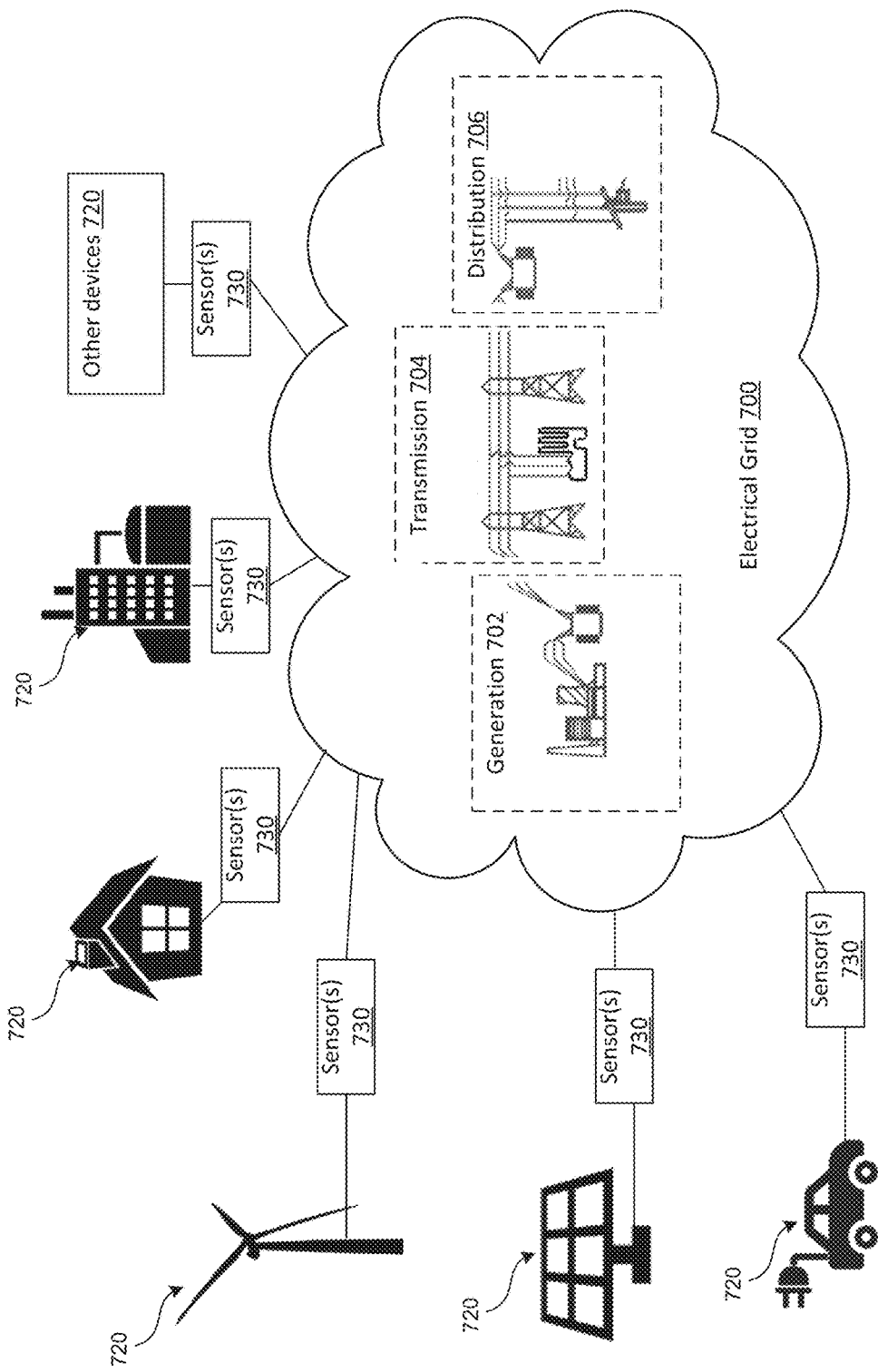
FIG. 7 shows a diagram of an example system of devices connected to the edge of an electrical grid.

FIG. 7 is a diagram that shows an example electrical grid 700. As previously mentioned, in some cases, an electrical grid can include electrical generation facilities 702 operated by one or more utilities, electrical transmission facilities 704 for transmitting electricity over long distances, and distribution facilities 706 for delivering electricity to devices 720 connected to the edge of the grid 700. In some cases devices 720 connected to the edge of the grid may include one or more sensors for detecting the state of the electrical grid, at least at the particular point of connection. Devices can include any types of devices connected to the electrical grid. In some cases such devices may include sensors configured to sense certain conditions that may impact the state of the electrical grid. In some cases such devices may include network capabilities to receive and transmit data to a remote computing resource (e.g. platform 100). The state of the electrical grid at any given point of connection may be reflected in any number of measurements. For example, the state may refer to the electrical state of the point of connection based on measured current, voltage, power, reactive power, or any other factor that impacts the electrical state of the grid. In some examples, the state of the electrical grid at a certain point of connection may also refer to the state of the environment surrounding that point of connection. For example, the state of the environment may be based on measured temperature, wind, sunlight, moisture, location as indicated by GPS or other locational data, location relative to physical connection or proximity to other devices on the electrical grid, or any other environmental factor that may impact the electrical grid.

FIG. 7 shows some example devices 720 connected to electrical grid 700, but is not exhaustive. In some embodiments the devices connected to the grid can include storage facilities (e.g. lithium ion batteries, flywheels, flow batteries, thermal storage, etc.) and advanced renewable technologies (e.g. photovoltaics, wind turbines, fuel cells, etc.), electric vehicles, electric vehicle charging systems, home battery systems, home and business microgrid systems, computer servers and server facilities with aggregated and adjustable power loads, large home appliances with adjustable loads like refrigerators and pool pumps and heaters, commercial building systems including lighting and heating systems, industrial equipment with adjustable power settings or the ability to adjust for reactive power controls, municipal and utility scale power storage facilities using pumped hydro storage or compressed air energy systems (CAES), and aggregations of any combination of large numbers of smaller energy consuming devices like cell phones chargers and computer chargers including or not including any of the other above systems or devices as well. In some embodiments, the device can include combinations of energy storage, energy consumption, and energy management devices. In some embodiments, the devices 720 connected to the grid 700 may be associated with DERs.

In some cases devices 720 connected to the grid 700 may include inverters configured to convert DC to AC to place electricity back on the grid, or to convert AC to DC for the purposes of meeting the technical requirements of DC and AC devices in a particular grid-connected environment, for example as may be required for home or business battery management software or microgrid management tools. For example, distributed renewable energy resources such as solar and/or wind power may generate more electricity than is needed to sustain a given load at their site. Such excess energy can be stored in batteries at the site and/or placed onto the grid. Consider, for example a grid tied photovoltaic system. In such a system, DC electricity from the PV panels is received at the inverter and converted to AC electricity to be placed on the grid. To do so, the inverter must effectively synchronize the phase and frequency of the AC to fit that of the grid. This process of synchronization includes sensing the electrical state (e.g. current, voltage, etc.) of the grid 700 at the point of connection. In addition to enabling effective synchronization, this information can be uploaded to Platform 100 to facilitate generation of an electrical grid model.

Figure 8:
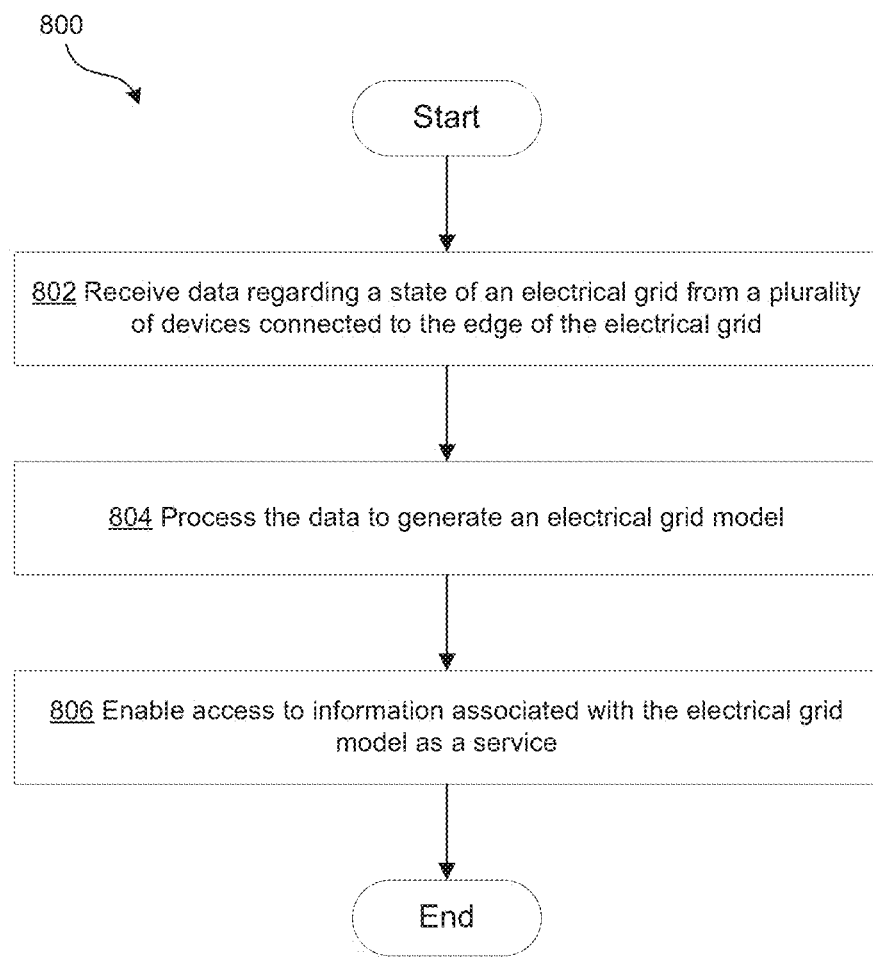
FIG. 8 shows a flow chart of an example process of generating and enabling access to an electrical model of an electrical grid.

FIG. 8 shows a flow diagram of an example process 800 for generating an electrical grid model according to some embodiments. The example process may be performed by one or more computing devices operating as part of Platform 100.

As shown in FIG. 8, process 800 may begin at step 802 with receiving (e.g. via a computer network) data regarding a state of an electrical grid from a plurality of devices connected to the edge of the electrical grid. In some cases, one or more of the plurality of device may be (but are not necessarily) third party devices. This means that the devices may not be owned, operated, managed, and/or controlled by an energy utility and/or the provider of Platform 100. Note however that in some cases an energy utility and/or the provider of Platform 100 may be allowed access to information about the device or its operating condition or environment, or allowed to provide pricing signals or other direct control of specific electrical operating parameters in response to specific energy market or grid operation requirements. In an embodiment, one or more of the plurality of devices connected to the edge of the electrical grid include devices associated with one or more distributed energy resources (e.g. a photovoltaic system, a wind turbine system, a fuel cell, a combined heat power system, etc.). For example, as previously mentioned, grid connected renewable energy resources such as PV may include inverters configured to sense the state (e.g. current and/or voltage) of the grid at the point of connection to facilitate synchronizing phase and frequency when converting DC to AC to place electricity on the grid.

Data generated as part of this sensing can be uploaded to the Platform 100 where it is at step 804 processed (e.g. using engine 120) to generate an electrical model of the grid that is indicative of the state of the grid at any given point of connection and point in time. In some embodiments, the electrical grid model is based on collected historical data. In some embodiments, the electrical grid model is continually updated in real time or near real time as streams of updated data is received from any of the plurality of devices connected to the edge of the grid.

The electrical grid model generated at step 804 can provide users 103 with invaluable information about the current state of an electrical grid. Accordingly, at step 806, platform 100 can enable users 103 to access information associated with the electrical grid model, for example as a cloud-based service. As previously mentioned, users 103 may access information via computing devices connected to a network 110. In some embodiments, access may be provided via an application program interface (API) associated with Platform 100.

Physical Grid Model

In some embodiments, Platform 100 can include an engine 122 for generating a physical grid model of the electrical grid based on received data. In this context, a "physical grid model" can refer to a representational model of the locations and logical arrangement of physical objects associated with an electrical grid. Examples of physical objects associated with the electrical grid include devices connected to the edge of the electrical grid (e.g., consumer devices, industry devices, DER devices, etc.) as well as devices and other physical objects making up at least a portion of the electrical grid infrastructure (e.g., generation facilities, transmission and distribution lines, substations, transformers, etc.).

Figure 9:
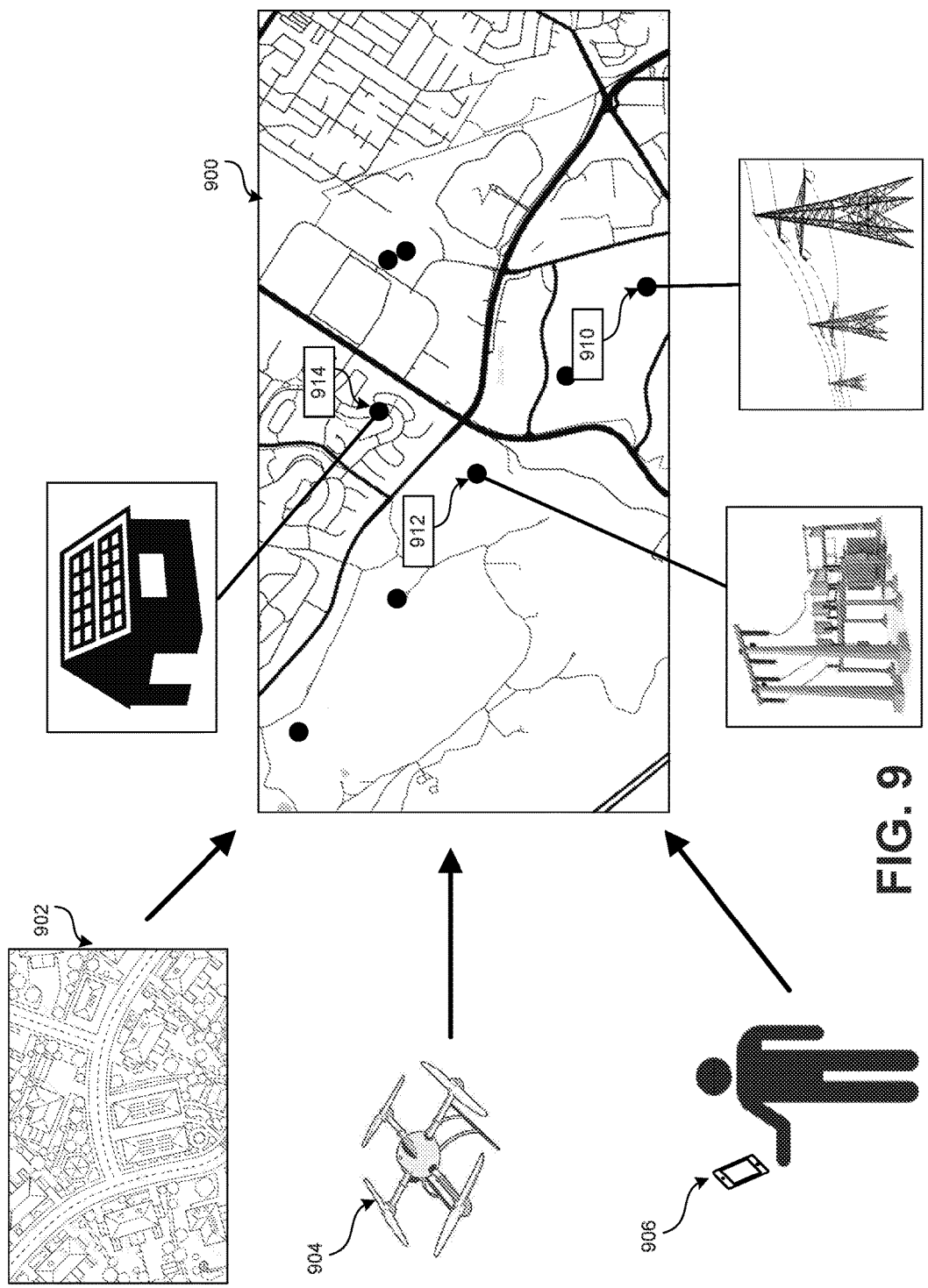
FIG. 9 diagrammatically illustrates the concept of generating a physical model of an electrical grid based on imagery data.

FIG. 9 shows a high level diagram that illustrates the concept of generating a physical grid model. As shown in FIG. 9, data, for example in the form of imaging data associated with a physical environment can be processed to identify physical objects associated with an electrical grid in a physical environment. In some embodiments imaging data may be received in the form of satellite or aerial (e.g. from a plane or drone) imagery 902. Imagery may include aerial photography, LIDAR, or any other aerial imaging process. For example, the data may include KML files (e.g. Google Earth images) that include satellite imagery of a physical environment. In some embodiments such satellite imagery may be part of a computer-generated map created using logic to estimate where physical objects should be based on any combination of the physical location and characteristics of such objects as well as their spatial relationships with other physical objects in the physical environment. In some embodiments, this data may be supplemented with imagery from other sources such as planes or drones 904 in flight over the physical environment and/or any other network connected devices with image capture capabilities. For example, in some embodiments images may be received from personal devices 906 (e.g. smart phones, tablets, AR devices, etc.) located within the physical environment.

The data received from sources 902, 904, 906 can be processed, for example using computer vision/image recognition processes to identify physical objects in the physical environment that are associated with the electrical grid. Although not shown in FIG. 9, imagery data from sources 902, 904, 906, can also be combined with other data sources (e.g. information from a utility) to better identify such physical objects. Further, as a result of this processing, inferences can be made regarding how the identified physical objects are logically related to form a physical model of the electrical grid as represented by the map 900 including physical object locations indicated by the black dots. As previously alluded to further illustrate, located physical objects may include transmission/distribution infrastructure such as power lines 910, a transformer substation 912, or edge connected devices such as residential solar installation 914. Note, the physical objects depicted in FIG. 9 are just examples provided for illustrative purposes. Generating the physical grid model may include identifying any other types of physical objects involved in the generation, transmission, distribution, and/or consumption of electricity via the grid.

Figure 10:
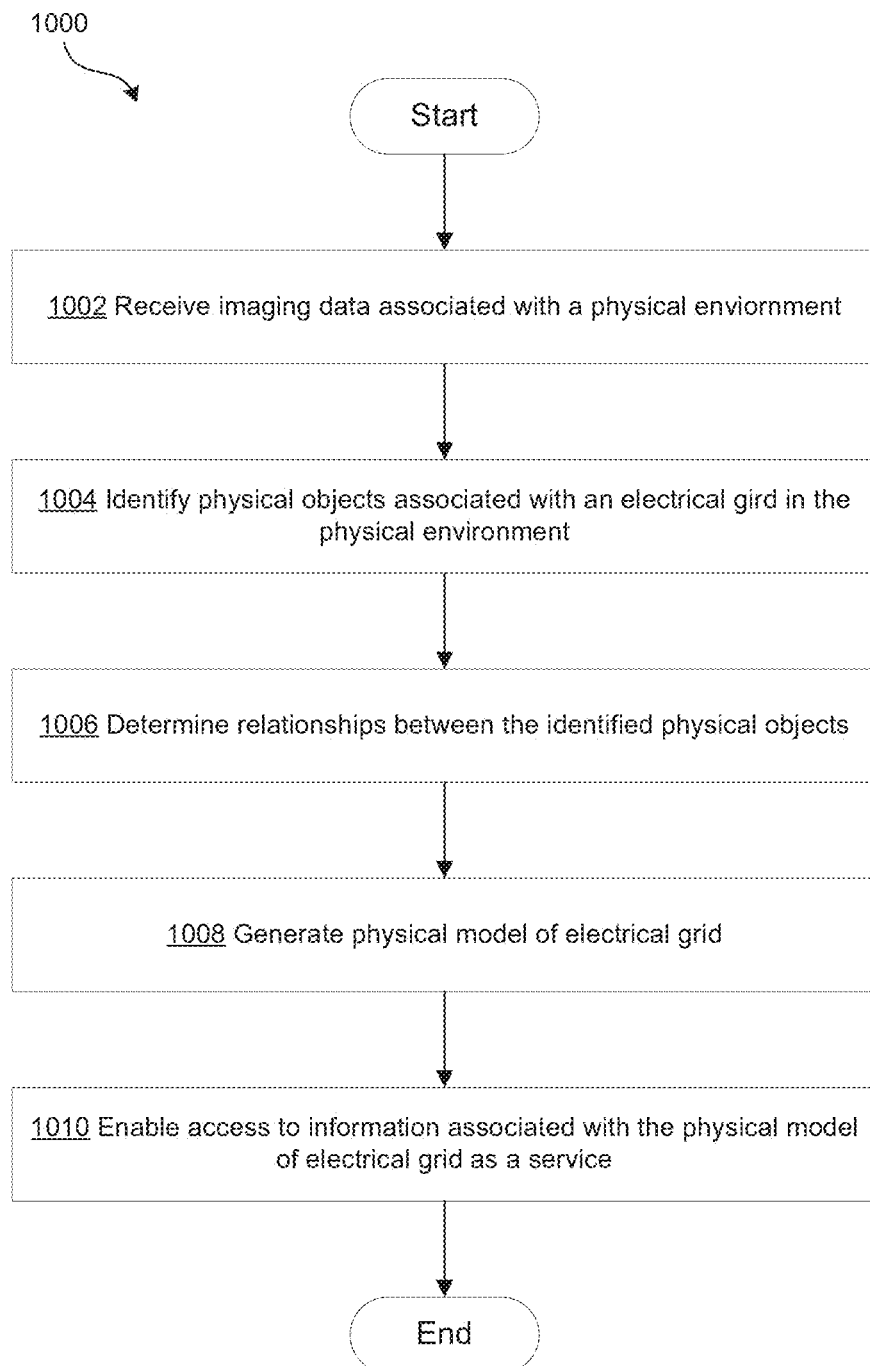
FIG. 10 shows a flow chart of an example process of generating and enabling access to a physical model of an electrical grid.

FIG. 10 shows a flow diagram of an example process 1000 for generating a physical grid model according to some embodiments. The example process may be performed by one or more computing devices operating as part of Platform 100.

As shown in FIG. 10, process 1000 may begin at step 1002 with receiving (e.g. via a computer network) imaging data associated with a physical environment. As mentioned, this imaging data may be received from multiple source (e.g. sources 902, 904, 906) and may be tied to location data, for example in the form of KML files.

Process 1000 continues at step 1004 with processing the received imaging data to locate and identify physical objects in the physical environment that are associated with an electrical grid. This step may involve machine-learning-based computer vision/image recognition techniques such as, but not limited to deep learning through neural networks to identify physical objects in the imagery data. In some cases, such techniques may be trained at least in part using previously collected imagery of physical objects that are known based on data available from entities that own or manage the physical objects (e.g., a utility). In some embodiments the process of identifying physical objects may rely solely on image processing. In other embodiments, processing the imagery data to identify physical objects may involve cross referencing with available location data regarding known physical objects (e.g. provided by a utility). In some embodiments the process of identifying physical objects may include inferring the identity or type of a physical object based on its locational relationship to other identified physical objects. For example, physical objects that are relatively evenly spaced along a known or inferred transmission route may be identified as transmission line towers based in part on their physical arrangement. Similarly, imagery of certain facilities along this route may be inferred to correspond with transformer substations or other types of facilities that are typically associated with the transmission and/or distribution of electricity.

Process 1000 continues at step 1006 with determining relationships between the identified physical objects based in part on their relative locations. For example, as previously mentioned, the transmission route may be inferred based on a number of identified electrical line towers in the physical environment. Similarly, identified edge-connected devices may be inferred to draw power from an identified step down transformer based at least in part on their physical proximity to each other. These are just a few examples of how relationships between identified devices may be determined based at least in part on relative locations.

Process 1000 continues at step 1008 with generating the physical grid model based at least in part on the locations and determined relationships between the identified physical objects associated with the electrical grid. A physical grid model is represented in FIG. 9 as a map of physical object locations, however in practice the model may be in the form of a database of location data tied to object identifiers as well as one or more values tied to each object identifier defining, for example, certain characteristics of each object (e.g. type, size, owner, operator, etc.). In some embodiments, the physical grid model is continually updated in real-time or near real-time as new imagery data is received from any of a plurality of sources.

As with the electrical grid model, the physical grid model generated at step 1008 can provide users 103 with invaluable information about the physical and/or logical arrangement of the electrical grid. Accordingly, at step 1010, platform 100 can enable users 103 to access information associated with the physical grid model, for example as a cloud-based service. As previously mentioned, users 103 may access information via computing devices connected to a network 110. In some embodiments, access may be provided via an application program interface (API) associated with Platform 100.

Operational Grid Model

In some embodiments, the information associated with the electrical grid model describe with respect to FIGS. 7-8 and the physical grid model described with respect to FIGS. 9-10 may be combined to generate an overall operational model of an electrical grid. In other words the information regarding the electrical state at multiple points of connection can be combined with the locations of identified physical objects to provide real-time or near real-time information regarding the operation of particular identified physical objects associated with the electrical grid. Such information may be particularly helpful in analyzing how much energy generated by a renewable DER may be put onto the grid at a certain point of connection at any given time, understanding the operating impacts of natural disasters or acts of terrorism, and understanding other changes associated with the processes of modernizing, digitizing, and decentralizing the grid.

The aforementioned electrical grid models and physical grid models have been described as discrete models for illustrative purposes, however in some embodiments, the previously described processes may be simply combined into a single process (including more or fewer steps than as described with respect to FIGS. 8 and 10) for generating an operational grid model.

As with the previously described models, Platform 100 can enable users 103 to access information associated with the physical grid model, for example as a cloud-based service. As previously mentioned, users 103 may access information via computing devices connected to a network 110. In some embodiments, access may be provided via an application program interface (API) associated with Platform 100.

Augmented Reality Applications

Users may access information associated with any of the previously described models using augmented reality (AR) or virtual reality (VR) display devices connected to Platform 100 via a network 110. For example, in some embodiments, enabling access to information associated with a grid model (e.g. the operational grid model) may include displaying information associated with a particular physical object via an AR display device when the AR display device is in a line of sight and/or a threshold proximity to a location of the particular physical object in the physical environment. For illustrative purposes, the below described example interfaces are described in the context of an AR display device. However, it shall be appreciated that "augmented reality" in this context may also include devices that may be categorized as VR devices. For example, the "view" of the physical environment in any of the below embodiments may be a generated view (e.g., based on captured video of the physical environment or a generated 3D model of the physical environment.

The physical object in this context may include devices connected to the edge of the electrical grid and or infrastructure assets associated with the electrical grid. The information regarding the particular physical object may include, but is not limited to an identifier, information regarding the owner/operator/manager of the physical object, operation information such as current load, historical load, maximum load, and predictive operational estimates.

In some embodiments, the information presented via an AR display device may be based on a particular location, but may not be tied to an existing physical object. For example, in some embodiments Platform 100 may pull in weather/climate and solar radiation data. Using the operational model of the electrical grid along with the weather/climate and solar radiation data for a particular location, Platform 100 may generate estimates, for example, of how much solar-generated electrical capacity could be injected safely into the grid at a particular site. Similarly, using an operational model in conjunction with historical and/or current energy market information, Platform 100 may generate an estimate of the economic value of a battery or some other energy component placed at a particular location. All of this information may be presented to a user via an AR display device.

Figure 11A:
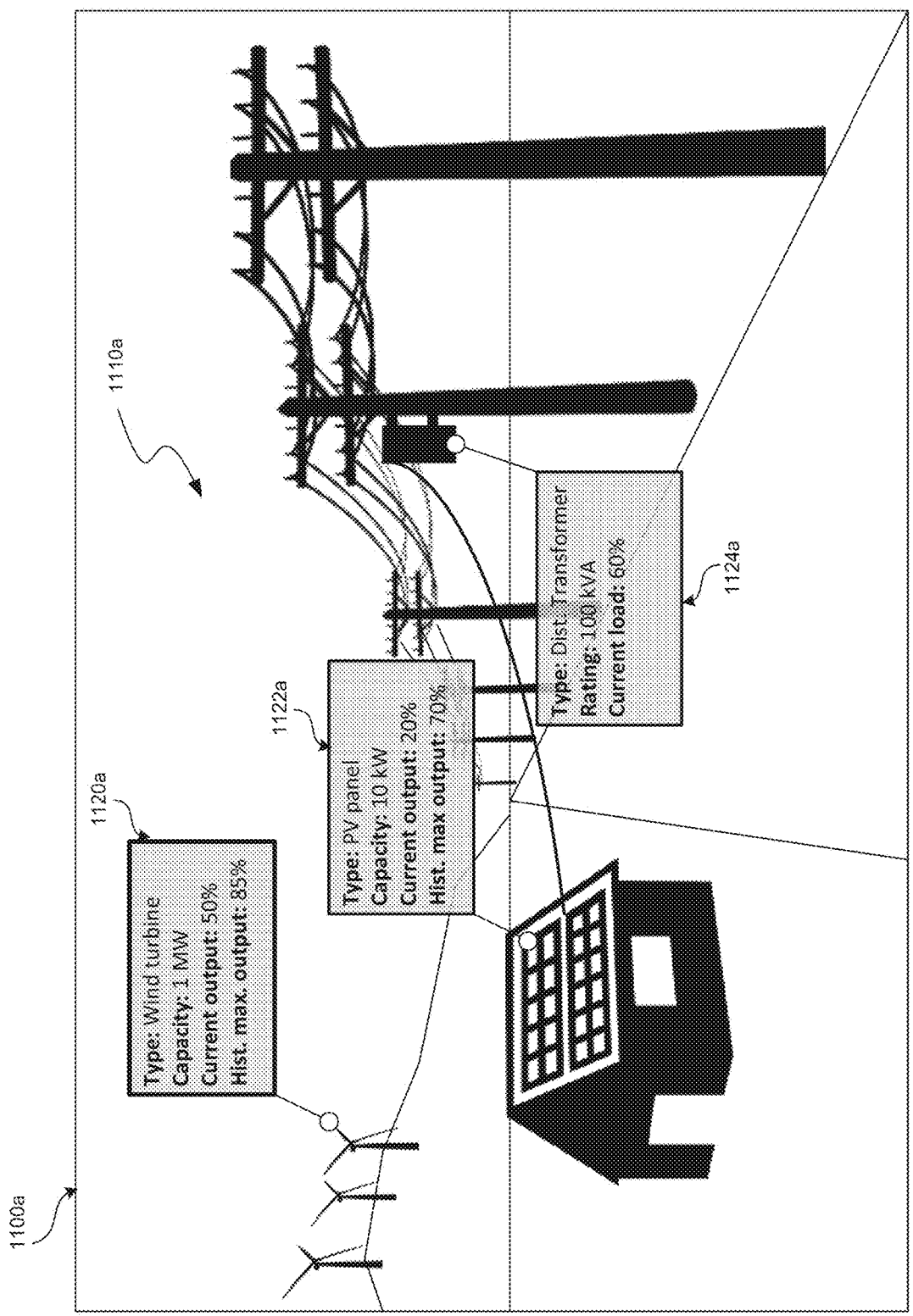
FIGS. 11A-11D show several example augmented reality interfaces through which to access information from an energy grid platform.

FIG. 11A shows an example view 1100a from a user's perspective via an AR display device of a physical environment 1110a. As shown in FIG. 11A, in some embodiments, one or more graphical elements 1120a, 1122a, 1124a including information based on one or more grid models may be displayed to a user via a display of the AR display device. For example, in an embodiment a user in a physical environment may hold a smart phone up and via a video capture device display a real time view 1100a of the surrounding physical environment 1110a with augmenting graphical overlays 1120a, 1122a, 1124a. In other embodiments, the AR display device may include a transparent display (e.g., a head mounted display) through which the user can view the surrounding physical environment 1110a. The transparent display may comprise a waveguide element made of a light-transmissive material through which a projected image of one or more graphical elements 1120a, 1122a, 1124a are propagated and directed at users eyes such that the projected images appear to the user to overlay a view of the physical environment 1110a and correspond with a particular physical object or point in the physical environment.

The example view 1100a depicted in FIG. 11A includes graphical elements 1120a, 1122a, and 1124a that include general information related to physical objects present in the physical environment 1110a. As mentioned, the information displayed may be based at least in part on information associated with one or more models of the electrical grid generated at Platform 100. For example, graphical object 1120a includes information related to one or more wind turbines present in the physical environment 1110a. In an embodiment, the graphical object 1120a may be displayed to a user via an AR display device when the user is, for example, within a line of sight of the one or more wind turbines and/or is within a threshold proximity to the one or more turbines. Similarly, the graphical object 1122a may be displayed to a user via an AR display device when the user is, for example, within a line of sight of a rooftop photovoltaic installation and/or is within a threshold proximity to the rooftop photovoltaic installation. Similarly, the graphical object 1124a may be displayed to a user via an AR display device when the user is, for example, within a line of sight of a distribution transformer and/or is within a threshold proximity to distribution transformer. The information displayed via any of graphical objects 1120a, 1122a, and 1124a will depend on the particular implementation. For example, as shown in FIG. 11A, in some embodiments, the AR interface may simply display general information corresponding to a particular physical object (e.g., "wind turbine," "PV panel," "distribution transformer," etc.) as well as operation information such as capacity, current output, historical output, etc. In some embodiments, the operational information may include real-time, near real-time (e.g., within seconds or minutes), and or historical data derived in part based on one or more grid models at Platform 100, as well as other useful information on the object (e.g., the name of the manufacturer, product specifications and safety features, historical installation and maintenance information, ownership, service instructions, etc.). The values included in such data may be aggregated using different functions such as average, maximum, minimum, percentage, median, percentage, etc., or otherwise represented in a way that is most helpful to the viewer, such as in a specific translated language, larger font size, or with automated reading of the available information.

Figure 11B:
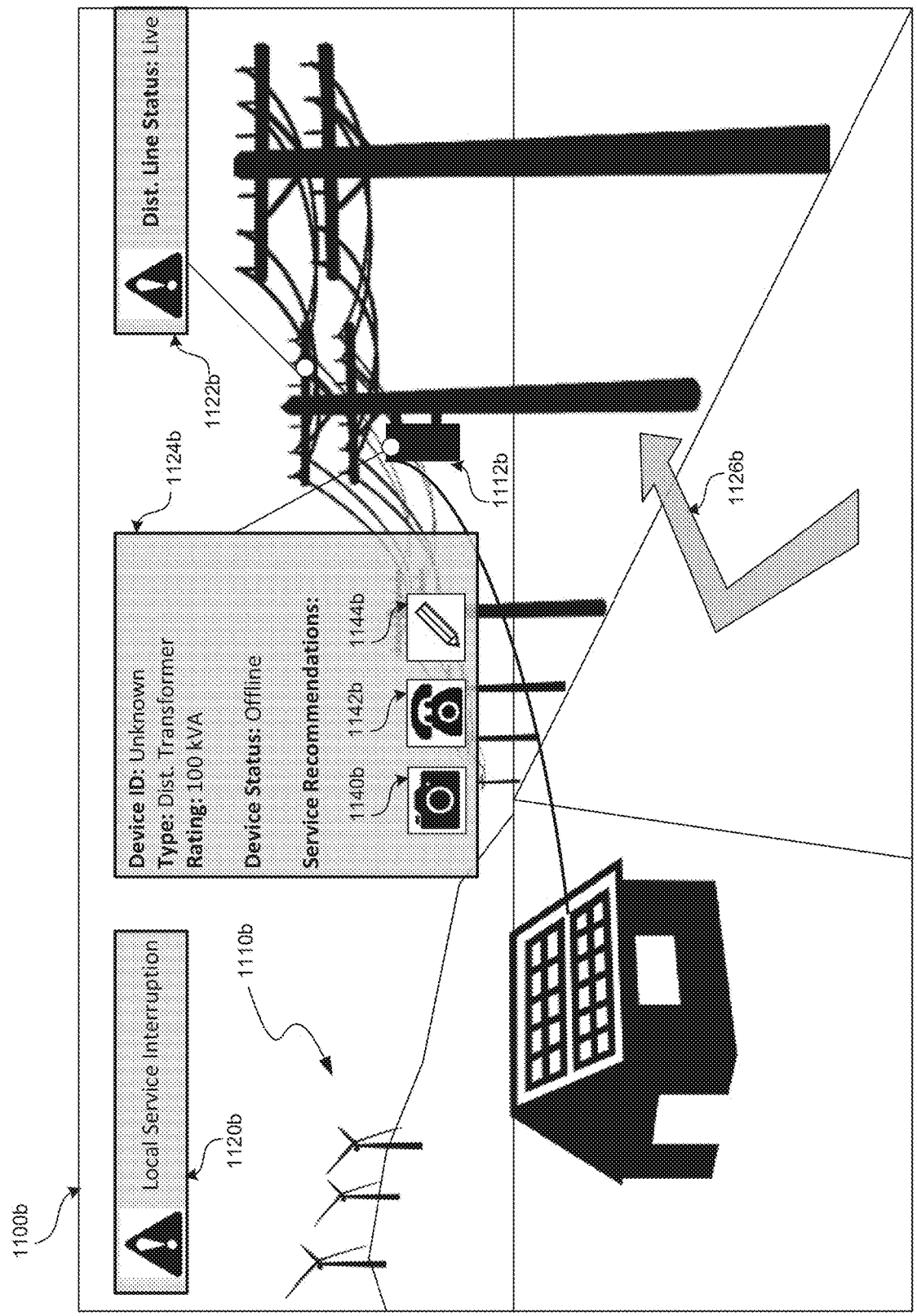
Figure 11C:
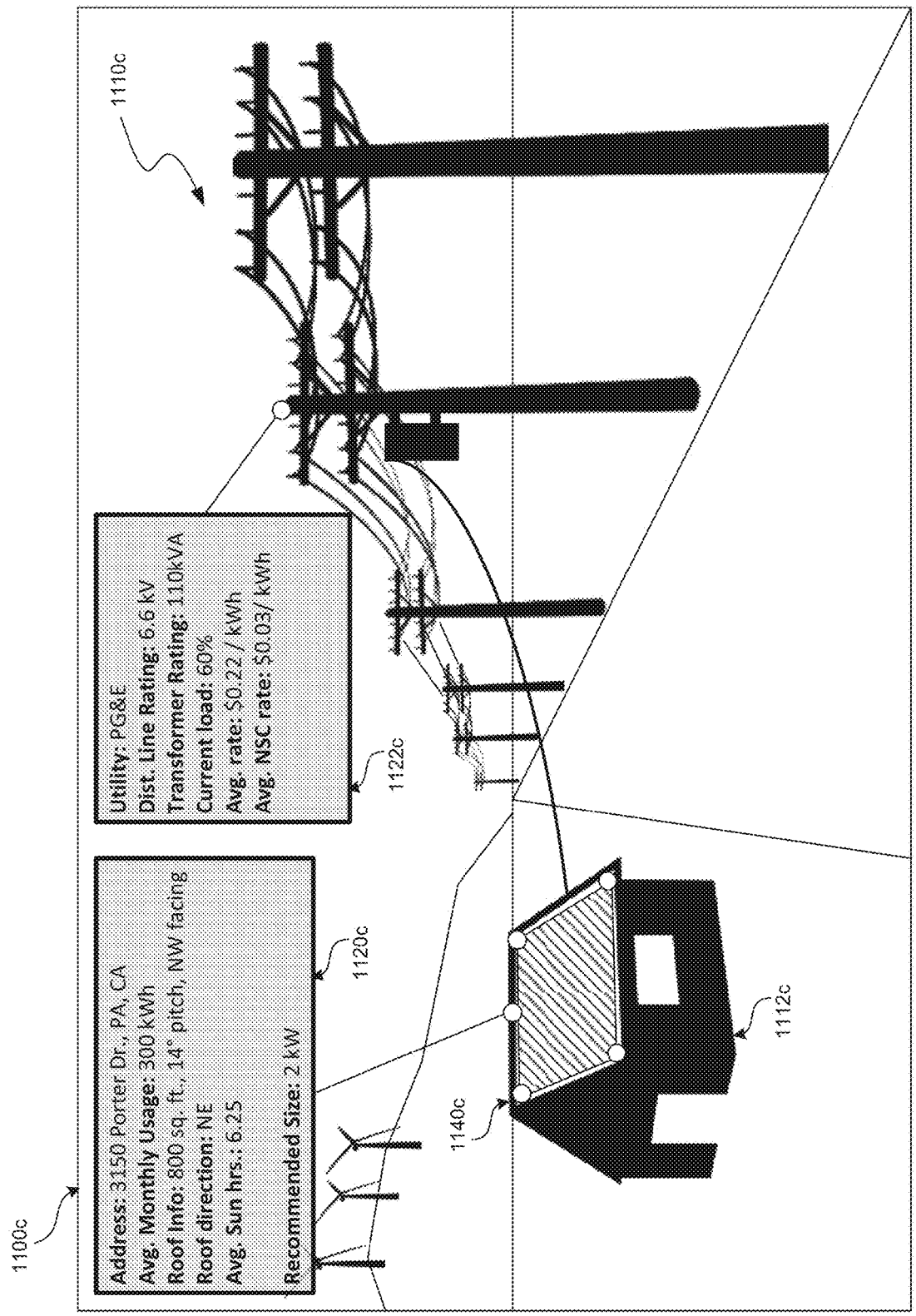
Figure 11D:
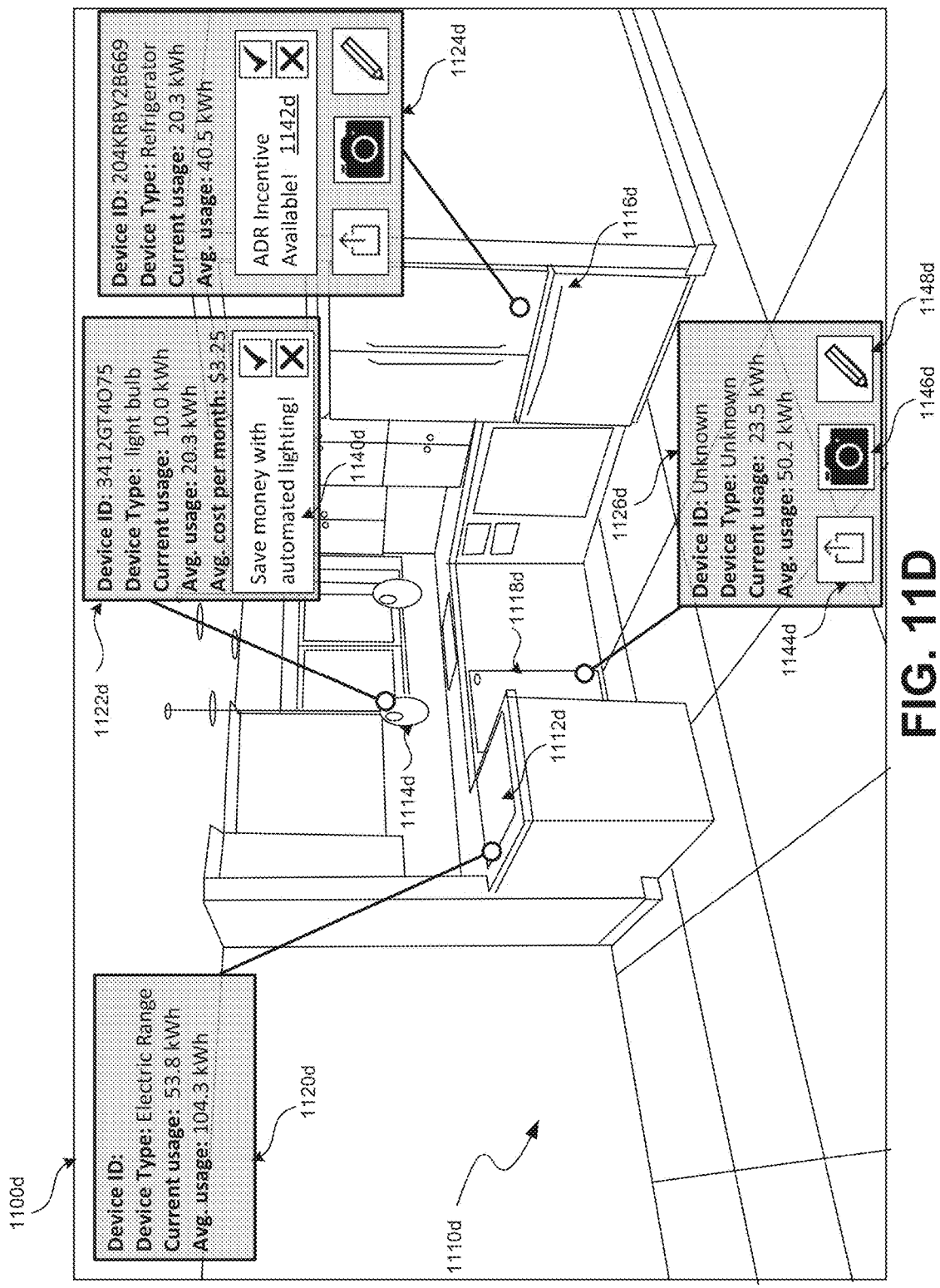

It shall be appreciated that view 1100a depicted in FIG. 11A shows a basic illustrative example of how a user may access information based on grid models at Platform 100 via an AR interface and is not to be construed as limiting. The information displayed, the manner in which information is presented (graphically or otherwise), the arrangement of presented information (e.g. graphical elements), and the interactive features will differ depending on the particular implementations. FIGS. 11B-11D show several other illustrative examples of how a user may access services provided by Platform 100 via an AR interface, according to some embodiments.

FIG. 11B shows an example view 1100b from a user's perspective via an AR display device of a physical environment 1110b. As mentioned, the displayed interface may include elements specifically curated for a particular application. For example, the view 1100b depicted in FIG. 11B may be intended for a line operator working for a utility or a utility equipment vendor. Such a view may be generated by an entity-specific (e.g., the utility) application instantiated at a device of the user and or may be generated remotely (e.g., at an application instantiated at a server of Platform 100) and streamed to the user's AR display device.

As shown in FIG. 11B, view 1100b may include one or more elements that are displayed to a user when that user is, for example, within a line of sight or a threshold proximity with a physical object in the physical environment 1110b. In the illustrated example of FIG. 11B, the user (e.g., a line worker) is presented with graphical objects 1120b, 1122b, 1124b, and 1126b. Consider an example scenario in which a power outage has been detected and a utility managing aspects of the grid within a vicinity of the detected outage has dispatched a line worker (i.e., the user) to inspect and/or perform maintenance to remedy the outage. In an embodiment, the user may be presented with general service alerts, for example, as illustrated in graphical element 1120b. Such services alerts may be automatically generated and displayed via the AR interface based on real-time or near real-time updates gathered based on a grid model (e.g., electrical or operational) at Platform 100. In some embodiments, service alerts may be manually generated, for example, by the utility itself, and displayed to one or more associated users (e.g. the line worker) that may act on the information. In some embodiments, the service alert may be automatically displayed to a user when that user is within a threshold proximity to an area affected by the service alert. Alternatively or in addition, in some embodiments such a service alert may be displayed to specific users (e.g. line works) assigned to service an area affected by an outage.

Graphical element 1120b displaying the service alert can in some embodiments include more information than is depicted in FIG. 11B, for example, graphical element 1120b could include a display of a real-time or near real-time feed of service updates received from Platform 100, additional details regarding the service alert (e.g., area of outage, number of households affected, duration, etc.), and any other information that may be of use to a user responding to the service alert.

In the example scenario depicted in FIG. 11B, the service outage has been caused by a blown distribution transformer 1112b operating at the edge of the grid. This point of failure may have been detected in real-time or near real-time by Platform 100 based on data received, via a network, from the transformer 1112b itself or may have been inferred based on data received from other devices fed form the transformer 1112b. For example, the previously mentioned grid models (electrical, physical, and operational) may indicate that the particular transformer 1112b is down based on data received form consumer side devices that are fed by the transformer 1112b. Likewise, an end user or interested party could point an application-enabled cell phone or AR device at a grid-connected device to find out in real time more information on the grid outage and what the expected time to repair may be.

As shown in FIG. 11B, view 1100b may include indicators configured to direct the user towards a particular physical object or point of interest, for example the blown transformer 1112b determined to be the cause of the service outage. For example, a graphical element 1126b in the form of arrows may be overlaid on physical roadways to guide the user along a determined route to the physical object or point of interest. Although not shown in FIG. 11B, element 1126b may include additional information such as the current street, narrative directions, distance to physical object or point of interest, etc. Aspects of such a guiding feature may be implemented at least in part through integration with a third party service such as Google Maps™.

As the user arrives at a point of interest (e.g., the blown transformer 112b) they may be presented with information related to physical object or point of interest. For example, in an embodiment, a graphical object 1124b is displayed to the user via view 1100b when the user is, for example, within a line of sight of the transformer 1112b and/or within a threshold proximity to the transformer 1112b. Similar to the graphical objects described with respect to FIG. 11A, graphical object 1124b may include information associated with the particular physical object or point of interest. For example, information such as a device ID, device type, device rating and/or operation information such as a current load or operational status may be displayed to the user via graphical object 1124b.

In some embodiments, graphical display 1124b may include specific service recommendations. Such recommendation may include template recommendations suited for particular scenarios or may be automatically generated according the specific conditions in the field as determined by Platform 100. For example, using machine learning processes, Platform 100 may automatically generate a set of recommendations to remedy a given situation based on real-time or near real-time information gathered in part using an operational model at Platform 100. In some embodiments service recommendations may be manually generated by other users, for example a worker at a utility service dispatch, and presented to the user via the AR interface.

In some embodiments interactive options may be presented to a user via an AR interface. For example, the graphical element 1124b depicted in FIG. 11B includes an option to take a photograph 1140b, an option to place a call 1142b, and an option to edit information 1144b. Consider a scenario in which a line worker has arrived at the blown transformer, however information regarding the transformer is either unavailable or lacking via Platform 100. This may occur for a number of reasons such as service interruptions at the Platform 100, network interruptions, incomplete data in the one or more generated models at the Platform 100, etc. For example, many utilities have missing or incorrect data about objects connected to the grid, and the following options can be used to improve and consolidate missing or incorrect data at Platform 100. If the line worker needs additional information they may elect to utilize one or more options 1140b, 1142b, or 1144b.

A camera option 1140b may enable a user to take a photograph of an object of interest (e.g., the transformer 112b) using an image capture device associated with the AR display device. As mentioned, the AR display device may be a smart phone or wearable device with an integrated image capture device. In an embodiment, data associated with the captured image and/or the image itself is automatically transmitted via a computer network to computing devices operating as part of Platform 100. Similar to as described with respect to FIG. 9, this data may be fed into one or more model engines to update the one or more grid models at Platform 100. For example, if the device ID and/or device type of the blown transformer is unknown, a user may capture an image of the transformer including to assist in the identification process. In an embodiment, the user may be prompted to specifically capture identifying information such as model number or serial number included in an affixed label. Computer vision processing may be applied (at the AR display device and/or servers of Platform 100) to recognize identifying features associated with the object in question and feed that information into the one or more grid models.

A telephone option 1142*b* may enable a user to place a call to an appropriate entity for information regarding an object of interest. For example, in an embodiment, in response to selecting option 1142*b*, a user device (e.g., the AR display device or an associated communication device) may automatically place a call to a utility service center, dispatch, equipment vendor support, etc.

An edit option 1144*b* may enable a user to directly edit information associated with a particular object in the physical environment 1110*b*. For example, if the device ID and/or device type of the blown transformer is not available via Platform 100, but is otherwise known to the user, for example, through direct observation, the user may input such information using option 1144*b*. Input may be performed using any means of data input such as typed text, voice recognition, etc. Information entered by the user via option 1144*b* can then be automatically sent, via a computer network, to computing systems operating as part of Platform 100 and fed into the one or more grid model engines. In some embodiments, Platform 100 may prompt a user to input observable information via option 1144*b* where data regarding a particular physical object or point of interest is specifically lacking.

As the user begins interacting with objects associated with the grid, additional information may be displayed to the user. For example in an embodiment, as a line worker begins working on the blown transformer 1112*b*, an alert 1122*b* may be displayed in response to a determination that the distribution lines feeding the transformer are now live. In some embodiments, such alerts may rely on the internal sensing capabilities of the utility managing the distribution lines. Alternatively, in some embodiments such alerts may be based on determinations made at Platform 100 based on processing real-time or near real-time data (e.g. as received from sensors in the vicinity) using the one or more grid models (e.g. the operational model).

FIG. 11C shows an example view 1100*c* from a user's perspective, via an AR display device, of a physical environment 1110*c*. As mentioned, the displayed interface may include elements specifically curated for a particular application. For example, the view 1100*c* depicted in FIG. 11C may be intended for a developer working on a new renewable energy installation. Such a view may be generated by an entity-specific (e.g., the developer) application instantiated at a device of the user and or may be generated remotely (e.g., at an application instantiated at a server of Platform 100) and streamed to the user's AR display device. Such an interface may also be used by customers or investors into such an installation.

As shown in FIG. 11C, view 1100*c* may include one or more elements that are displayed to a user when that user is, for example, within a line of sight or a threshold proximity with a physical object in the physical environment 1110*c*. In the illustrated example of FIG. 11C, the user (e.g., a developer) is presented with graphical objects 1120*c* and 1122*c*. Consider an example scenario in which a developer is surveying a particular location in the physical environment for suitability for a new solar photovoltaic installation on a client's house 1112*c*. In an embodiment, the user may be presented with general information regarding the physical environment 1110*c*, physical objects associated with the electrical grid, and any other physical objects or points of interest in the physical environment 1110*c*.

For example, as shown in FIG. 11C, in an embodiment, a graphical object 1120*c* is displayed via view 1100*c* of an AR interface including information associated with a particular location or object in the physical environment. In this example, information associated with a client or potential client's house is displayed via graphical element 1120*c*. The displayed information may include general information such as an address, specific building information such as orientation and roof area, energy usage information, and/or environmental information such as the average hours of sunlight each day. The particular information displayed will depend on the particular implementation. For example an application configured for wind power development may include different information than an application configured for solar development.

Also shown in FIG. 11C is a second graphical object 1122*c* which includes grid-related information that may be displayed to a to a user when that user is, for example, within a line of sight or a threshold proximity with physical objects associated with the electrical grid. For example, graphical object 1122*c* is shown in FIG. 11C as being tied to certain distribution infrastructure in the physical environment 1110*c*. In the example graphical object 1122*c*, information is displayed such as an identification of the managing utility, details on the distribution infrastructure (e.g., distribution line rating, distribution transformer rating, etc.), operational information such as current load, and pricing information such as average rate (e.g., per kilowatt hour) and average net surplus compensation (NSC) rate.

In some embodiments, design or sizing recommendations may be provided. For example, graphical object 1120*c* includes a sizing recommendation of 2 kilowatts (kW) for a proposed photovoltaic installation. Such a recommendation can be based on a number of factors such including any relevant information presented via graphical objects 1120*c* and 1122*c*. Generated recommendations can be optimized according to selectable constraints. For example, in an embodiment design recommendations may be optimized to lower energy costs to the consumer, optimized to maximize service reliability, optimized to minimize grid power usage, optimized to meet certain utility demand response constraints, etc. Although not shown in FIG. 11C, recommendations may further include recommended equipment, equipment vendors, installers, integrators, financing services, incentives, etc.

In some embodiments, the AR interface of view 1100*c* may include one or more interactive features that can assist a user in the development process. For example, as shown in FIG. 11C, the AR interface may include an option 1140*c* through which a user can specifically define certain aspects of a proposed development site. Specifically, option 1140*c* is illustrated, in example form, as a set of manipulable nodes through which a user can define a surface on which to install photovoltaic panels. In an embodiment, images captured via an image capture device associated with the AR display device may be processed using computer vision techniques to automatically identify surfaces of objects in the physical environment. Using these identified surfaces, option 1140*c* may be presented to the user via an AR interface thereby allowing the user to specifically define an area of surface on which photovoltaic panels may be installed. In some embodiments, user defined parameters (e.g. as input via option 1140*c*) may inform the information presented to the user via the AR interface. For example, specific information (e.g., area, orientation, average sun hours, etc.) based on the user defined surface (input via option 1140c) may be displayed via graphical object 1120c.

As with the displayed information described with respect to FIG. 11B, information displayed via the interface of view 1100c in FIG. 11C may be accessed from multiple data sources such as the grid models at Platform 100, utilities, weather services, etc.

FIG. 11D shows an example view 1100d from a user's perspective, via an AR display device, of a physical environment 1110d. As mentioned, the displayed interface may include elements specifically curated for a particular application. For example, the view 1100d depicted in FIG. 11D may be intended for a residential energy consumer. Such a view may be generated by an application instantiated at a device of the user and or may be generated remotely (e.g., at an application instantiated at a server of Platform 100) and streamed to the user's AR display device.

As shown in FIG. 11D, view 1100d may include one or more elements that are displayed to the user when that user is, for example, within a line of sight or a threshold proximity with a physical object in the physical environment 1110d. In the illustrated example of FIG. 11D, the user is presented with graphical objects 1120d, 1122d, 1124d, and 1126d. The various graphical objects displayed via the interface depicted in FIG. 11D may be associated with physical objects such as devices in the physical environment 1110d. For example, the scene depicted in FIG. 11D is of a kitchen with a graphical object 1120d associated with an electric range 1112d, a graphical object 1122d associated with ceiling-hung lights 1114d, a graphical object 1124d associated with a refrigerator 1116d, and a graphical object 1126d associated with a dishwasher 1118d. Similar to the graphical objects described with respect to FIG. 11A, graphical objects 1120d, 1122d, 1124d, and 1126d may include information associated with the respective devices 1112d, 1114d, 1116d, and 1118d. For example, device information such as a device ID, device type, device rating and/or operation information such as a current usages, average usage, and average cost to operate may be displayed via the graphical objects.

In some embodiments interactive options may be presented to a user via the AR interface similar to as described with respect to FIG. 11B. For example, the graphical element 1126d depicted in FIG. 11D includes an option to share information 1144d, an option to take a photograph 1146d, and an option to edit information 1148d. The user may interact with such option similar to options 1140b, 1142b, and 1144b described with respect to FIG. 11B.

The camera option 1146d may enable a user to take a photograph of an object of interest (e.g., an appliance in the kitchen) using an image capture device associated with the AR display device. As mentioned, the AR display device may be a smart phone or wearable device with an integrated image capture device. In an embodiment, data associated with the captured image and/or the image itself is automatically transmitted via a computer network to computing devices operating as part of Platform 100. Similar to as described with respect to FIG. 9, this data may be fed into one or more model engines to update the one or more grid models at Platform 100. For example, if the device ID and/or device type of a device is unknown, a user may capture an image of the device to assist in the identification process. In an embodiment, the user may be prompted to specifically capture identifying information such as model number or serial number included in an affixed label. Computer vision processing may be applied (at the AR display device and/or servers of Platform 100) to recognize identifying features associated with the object in question and feed that information into the one or more grid models.

The edit option 1148d may enable a user to directly edit information associated with a particular object in the physical environment 1110d. For example, if the device ID and/or device type of a device is not available via Platform 100, but is otherwise known to the user, for example, through direct observation, the user may input such information using option 1148d. Input may be performed using any means of data input such as typed text, voice recognition, etc. Information entered by the user via option 1148d can then be automatically sent, via a computer network, to computing systems operating as part of Platform 100 and fed into the one or more grid model engines. In some embodiments, Platform 100 may prompt a user to input observable information via option 1148d where data regarding a particular physical object or point of interest is specifically lacking.

In some embodiments a share option 1144d may be provided through which a user may share certain information associated with a particular device. For example, in an embodiment, a user may share operational information associated with an associated device with another entity such as a utility or an equipment manufacturer by selecting option 1144d. Consider a scenario in which a user is communicating with a device manufacturer regarding the energy consumption of a particular device. By selecting option 1144d, the user may share device information and/or operational information with the manufacturer to facilitate discussion. Although not shown, in some embodiment the user may be presented with options to selectively share certain information and for limited periods of time for privacy protection. In some embodiments, the other entity, interacting via Platform 100, may specifically request certain information which can be then be automatically shared by the user through selecting option 1144d. In some instances, object owners or users or service providers can use this interface to enable communications about the object.

In some embodiments promotions may be presented to the user via an AR interface. For example, the graphical element 1122d depicted in FIG. 11D includes a promotion 1140d to save money on lighting and the graphical element 1124d includes a promotion 1142d to claim an incentive. The user may interact with such promotions similar to options 1144d, 1146d, and 1148d.

The promotion 1140d depicted in graphical element 1122d may be presented to the user via the AR interface similar to a targeted advertisement. For example, in the example scenario depicted in FIG. 11D, the graphical element 1122d is associated with hanging lights 1114d. The information depicted in graphical element 1122d may, in some embodiments be used to direct relevant promotions to the user. For example, the device type, average usage, and average cost associated with the hanging lights 1114d may indicate that the user may be able to save money by, for example, switching to a different brand, bulb type, or by automating their lighting system. Based on this information, promotional offers may be presented to the user, for example, from device manufacturers, retailers, installers, service providers, utilities, etc. The promotion 1122d may enable the user to accept or ignore by providing interactive elements such as the accept and deny buttons depicted in FIG. 11D. In some embodiments, in response to accepting a promotion the user may automatically be directed to additional information regarding the offer, for example via a link to the offeror's website.

In some embodiments offers may be based in part on the state of the grid. For example, depending on the load on portions of the grid at any given time, a utility may wish to incentivize reduced usage and or directly control certain usage to maintain stability and prevent service interruptions. For example, using automated demand response (ADR) techniques, a utility may send signals to certain network connected energy consuming devices to turn off or reduce power consumption during peak load times. To gain such control over end-user devices a utility may offer the users of such devices incentives such as reduced rates, energy credits, etc. Accordingly, in some embodiments, incentives related to ADR may be presented to users via an AR interface, for example similar to promotion 1142d depicted in graphical element 1124d. Through promotion 1142d, a use may easily accept an ADR incentive related to the energy consumption of their refrigerator without having to look up the appropriate inventive or contacting the utility to discuss. If the user accepts the ADR incentive, access can be automatically granted to the utility to adjust energy consumption by the affected device in response to real-time or near real-time demand on the grid. In some embodiments, promotions such as promotion 1142d may be time-based meaning that they may be presented to users during periods of increased demand and may grant the utility temporary ADR privileges for a selectable or predefined period of time.

In some cases, network connected devices may be associated with an "energy page." An energy page can generally be understood as a web page through which information regarding the device is displayed and/or options to interact with the device are available. For example, a network-connected device may be linked to its own energy page based on an identifier such as an IP address. An energy page can include not only information associated with the device, but also information associated with the energy generation and/or consumption by the device. In some embodiments, an energy page may include interactive options to, for example, set configurations for the device. For example, through an energy page, a user may sign up for utility incentives, share data, adjust generation/consumption characteristics, set automation features, etc. An example interface that may be associated with such an energy page is described with respect to FIG. 12.

In some embodiments, devices may come preconfigured to be associated with a particular energy page. For example, network connected devices such as routers have internal addresses associated with web pages through which a user can, for example, view network traffic information and/or configured the device. A similar concept can be applied to energy consumption and/or generation. For example, through accessing a webpage (e.g. using an IP address) associated with the refrigerator 1116d, a user may view information about the refrigerator's energy consumption or usage habits (e.g. similar to that displayed with respect to graphical element 1124d). The user may also configure the refrigerator 1116d, for example to allow ADR control, set energy consumption characteristics (e.g. set temperature), and set up automated timing features.

In an embodiment, the adoption of energy pages may be assisted at least in part through AR interaction. For example, in an embodiment, in response to determining that an AR display device is within a line of sight or a threshold proximity with a physical object (e.g., refrigerator 116d) in the physical environment 1110d, a system in accordance with the present teachings may determine if the physical object is a device connected to the electrical grid, and if so whether the device is associated with an energy page. For example, consider an embodiment in which refrigerator 1116d is connected to a computer network. In some embodiments, refrigerator 1116d may be in active communication with Platform 100 and/or Platform 100 may include gathered information regarding refrigerator 1116d (e.g., based on one or more grid models). In any case, Platform 100 may have access to an identifier (e.g. IP address) associated with the refrigerator 1116d and a location (e.g., GPS coordinate) of the refrigerator 1116d. Using the location of the refrigerator 1116d and the location of an AR display device, an inference may be made that the physical object within a line of sight or a threshold proximity to the AR display device corresponds to the refrigerator 1116d. Further, based on the identifier associated with the refrigerator it may be determined if the refrigerator is associated with an energy page 1116d. In some embodiments, if the refrigerator 1116d is associated with an energy page, that energy page may be automatically displayed to a user via the AR display device. If the refrigerator 1116d is not associated with an energy page, an energy page may be automatically created and associated with the refrigerator 1116d. In some embodiment, before creating the energy page, the AR display device may display an element prompting the user to accept or reject the creating of a new energy page.

The AR features described with respect to FIGS. 11A-11D are exemplary and are provided for illustrative purposes. They are not to be construed as limiting. Other embodiments of an AR interface may display different information, may arrange the information differently, and/or may include more or fewer interactive features.

Example Web Interface

Figure 12:
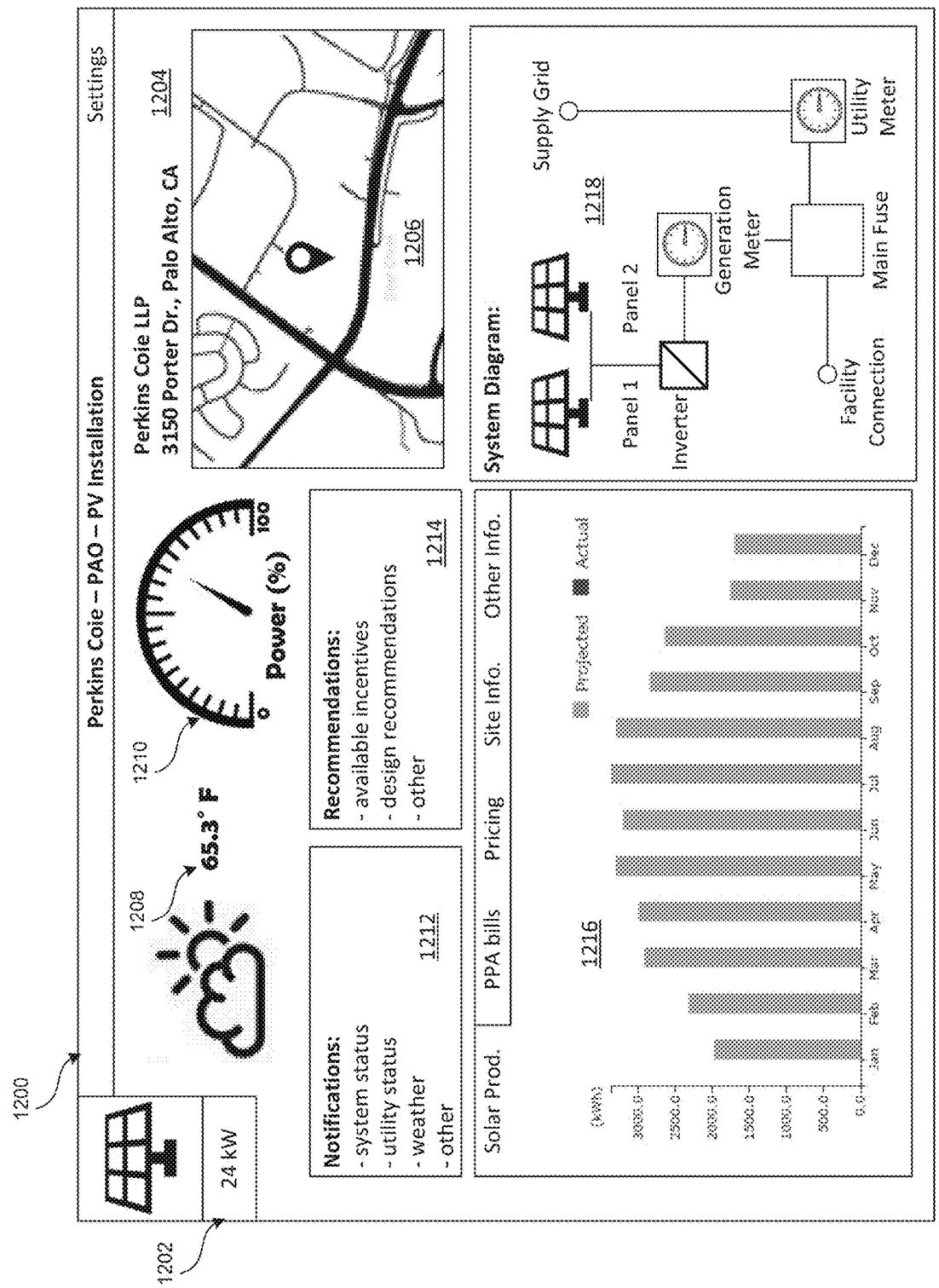
FIG. 12 shows an example web interface through which to access information from an energy grid platform.

As previously described with respect to FIGS. 11A-11D, users may access information associated with any of the previously described grid models using AR or VR display devices connected to Platform 100. However, in some embodiments, information may be accessed via other means, for example via a web-based interface. FIG. 12 shows an example of such a web-based interface 1200. In some embodiments, interface 1200 may be generated at a web server associated with platform 100 and displayed via a web-browser application instantiated at a user device (e.g. a laptop or smart phone device). In some embodiments, the interface 1200 may be generated and displayed at an application instantiated at the user device based on data receive from Platform 100. In some embodiments the interface 1200 depicted in FIG. 12 may be an energy page (described previously) that is specific to one or more devices that are connected to an electrical grid.

An interface similar to interface 1200 may include multiple graphical elements configured to convey information associated with one or more devices connected to the electrical grid. As with the AR features described with respect to FIGS. 11A-11D, the information displayed via interface 1200 may be based at least in part on the one or more aforementioned grid models generated at Platform 100. The interface 1200 shown in FIG. 12 is an example of an energy page associated with a photovoltaic installation. The example interface is depicted for illustrative purpose, but is not to be construed as limiting. Other embodiments may include fewer or more elements than as shown, may include alternative arrangements of elements, and/or may display alternative information.

As shown in FIG. 12, interface 1200 includes basic information regarding the photovoltaic installation including the capacity 1202 (in this example, 24 kW), the address 1204 of the installation site, and a map 1206 showing the installation site location. Interface 1200 may also include several elements displaying real time environmental and/or operational information such as the current weather 1208, current power generation output 1210, and real-time and/or near-real time notifications 1212. As shown, the notifications elements 1212 may include notifications related to systems status, utility status, weather, and any other information that may be pertinent depending on the situation. Interface 1200 may also include an element 1214 including recommendations, for example, recommended incentives/credits that are available, design recommendations based on environmental/operational information, etc. As previously mentioned, recommendations may be generated by one or more recommendation engines at Platform 100 or via a third party service.

In some embodiments, interface 1200 may include visualizations of certain data. For example, as shown in FIG. 12, interface 1200 includes a visualization 1216 of aggregated solar production per month over the span of a year. The example visualization 1216 shown in FIG. 12 is provided for illustrative purposes, however a person having ordinary skill will recognize that other interfaces may be configured to display one or more other visualizations, including different visualization types (e.g. pie chart, bar chart, line graph, etc.) and other data (e.g., sunlight hours, pricing, net metering, etc.).

In some embodiments, interface 1200 may include a system diagram 1218 including representations of the various components in a given system or device connected to the grid. For example, element 1218 depicted in FIG. 12 includes a system diagram of the various components (e.g. panels, inverters, meters, etc.) of a grid-connected photovoltaic system. In some embodiments, element 1218 may include interactive features. For example, although not shown in FIG. 12, in some embodiments interface 1200 may display data specific to the various components in response to user interaction with graphical elements representing the components. For example, a user may select (e.g. though a touch or mouse click) an icon associated with panel 1 and in response interface 1200 may display information (e.g. operational information) associated with the "Panel 1" in the system diagram 1218. In some embodiments, each graphical element representative of a device in system diagram 1218 may link to a web interface display specific to that device.

Example Processing System

Figure 13:
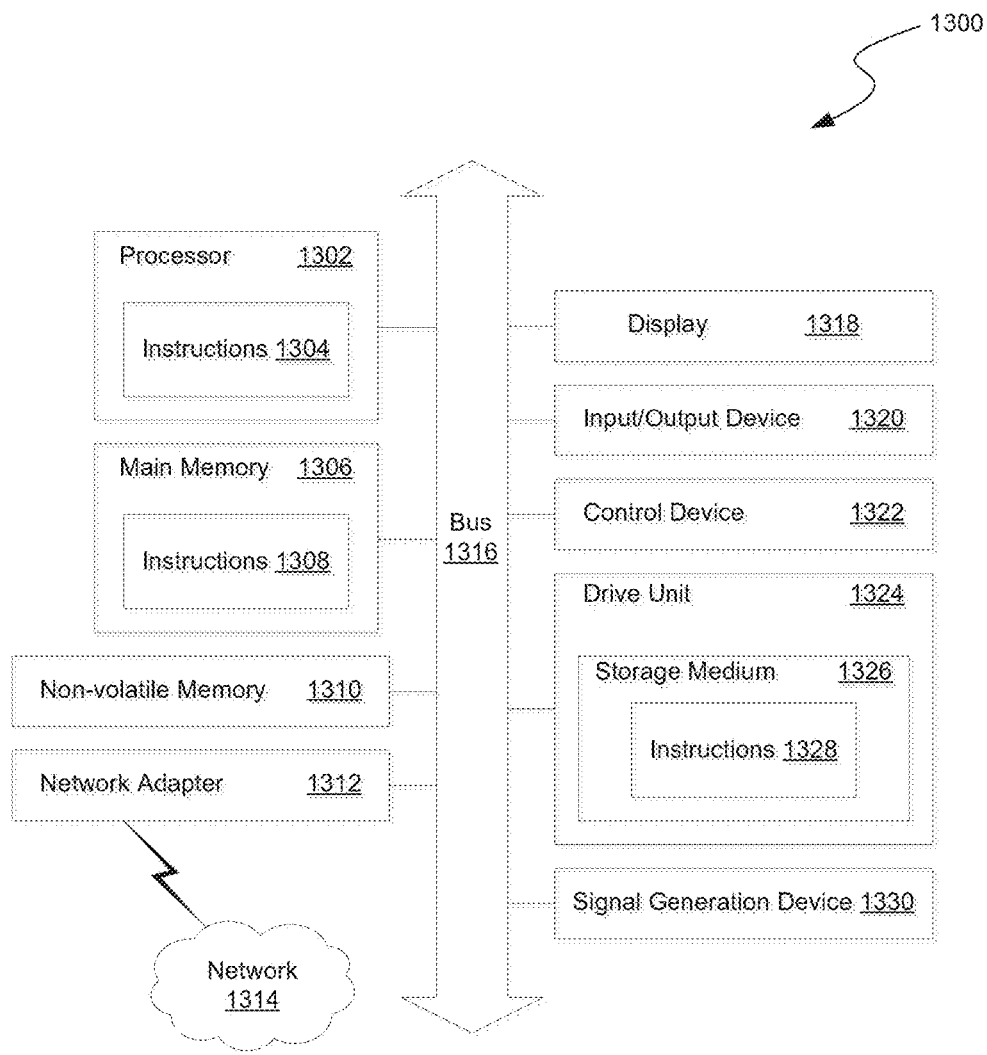
FIG. 13 shows is a block diagram illustrating an example computer processing system in which at least some operations described herein can be implemented.

FIG. 13 is a block diagram illustrating an example of a processing system 1300 in which at least some operations described herein can be implemented. As an example, at least a portion of the processing system 1300 may be included in one or more of the devices associated with system 600 described with respect to FIG. 6. The processing system 1300 may include one or more central processing units ("processors") 1302, main memory 1306, non-volatile memory 1310, network adapter 1312 (e.g., network interfaces), display 1218, input/output devices 1320, control device 1322 (e.g., keyboard and pointing devices), drive unit 524 including a storage medium 1226, and signal generation device 1330 that are communicatively connected to a bus 1316. The bus 1316 is illustrated as an abstraction that represents any one or more separate physical buses, point to point connections, or both connected by appropriate bridges, adapters, or controllers. The bus 1316, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of the network appliance, such as the switching fabric, network port(s), tool port(s), etc.

In various embodiments, the processing system 1300 operates as a standalone device, although the processing system 1300 may be connected (e.g., wired or wirelessly) to other machines. For example, the processing system 1300 may include a terminal that is coupled directly to a network appliance. As another example, the computing system 1300 may be wirelessly coupled to the network appliance.

In various embodiments, the processing system 1300 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 1306, non-volatile memory 1310, and storage medium 1326 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 1328. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 1304, 1308, 1328) set at various times in various memory and storage devices in a computer, and that, when read and executed by one or more processing units or processors 1302, cause the processing system 1300 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 1310, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 1312 enables the processing system 1300 to mediate data in a network 1214 with an entity that is external to the processing system 1300, such as a network appliance, through any known and/or convenient communications protocol supported by the processing system 1300 and the external entity. The network adapter 1312 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1312 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced here may be implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. An augmented reality (AR) system for presenting information associated with an electrical grid, the AR system comprising:
   a processing unit; and
   a memory unit communicatively coupled to the processing unit, the memory unit having instructions stored thereon, which when executed by the processing unit cause the AR system to:
      determine that an AR display device is within a line of sight and/or a threshold proximity with a physical object located in a physical environment, the physical object associated with the electrical grid;
      access an operational model of the electrical grid for information corresponding to the physical object, the operational model of the electrical grid generated by:
         processing imaging data associated with the physical environment to identify physical objects associated with the electrical grid in the physical environment; and
         processing data regarding a state of the electrical grid with data regarding the identified physical objects, the data regarding the state of the electrical grid received from sensors at a plurality of devices connected to the edge of the electrical grid that are not owned, operated, managed, or controlled by an energy utility associated with the electrical grid;
      the operational model associating real-time operating information based on the data regarding the state of the electrical grid with the identified physical objects associated with the electrical grid in the physical environment; and
      cause display, via the AR display device, of a graphical object including a representation of at least some of the accessed information corresponding to the physical object, the graphical object displayed via the AR display device so as to partially overlay a view of the physical environment.

2. The AR system of claim 1, wherein the AR display device includes any of a smart phone device, a tablet device, a head mounted display device, a virtual retinal display device, or a heads up display (HUD) device mounted in a vehicle.

3. The AR system of claim 1, wherein the physical object is any of a device connected to the edge of the electrical grid or infrastructure associated with the electrical grid.

4. The AR system of claim 1, wherein the graphical object includes a representation of operational information corresponding to the physical object, the operation information including information regarding the consumption and/or generation of electricity by a device associated with the physical object.

5. The AR system of claim 1, wherein the graphical object includes an alert regarding a state of at least a portion of the electrical grid.

6. The AR system of claim 1, wherein the graphical object includes an interactive element through which to receive a user input.

7. The AR system of claim 6, wherein the memory unit has further instructions stored thereon, which when executed by the processing unit cause the AR system to further:
   receive a user input, the user input based on a detected interaction with the interactive element of the graphical object, the user input including additional information corresponding with the physical object; and
   update the model of the electrical grid based on the received additional information corresponding with the physical object.

8. The AR system of claim 6, wherein the memory unit has further instructions stored thereon, which when executed by the processing unit cause the AR system to further:
   receive a user input, the user input based on a detected interaction with the interactive element of the graphical object, the user input including an image capture of the physical object; and
   update the model of the electrical grid based on the received image capture of the physical object.

9. The AR system of claim 6, wherein the memory unit has further instructions stored thereon, which when executed by the processing unit cause the AR system to further:

receive a user input, the user input based on a detected interaction with the interactive element of the graphical object, the user input including a defined location in the physical environment; and cause display, via the AR display device, of information corresponding to electrical grid infrastructure accessible to the defined location.

10. The AR system of claim 6, wherein the memory unit has further instructions stored thereon, which when executed by the processing unit cause the AR system to further:

receive a user input, the user input based on a detected interaction with the interactive element of the graphical object, the user input including a defined location in the physical environment; and cause display, via the AR display device, of a design recommendation for a distributed energy resource (DER) system to be installed, modified, or repaired at the defined location in the physical environment.

11. The AR system of claim 6, wherein the memory unit has further instructions stored thereon, which when executed by the processing unit cause the AR system to further:

receive a user input, the user input based on a detected interaction with the interactive element of the graphical object, the user input including a request to share at least some of the information corresponding with the physical object with another user; and cause the transmission of the at least some of the information for delivery to the other user.

12. The AR system of claim 1, wherein the graphical object includes a promotion corresponding to the physical object.

13. The AR system of claim 1, wherein the memory unit has further instructions stored thereon, which when executed by the processing unit cause the AR system to further:

automatically enable access to an existing energy web page in response to determining that the physical object is associated with the existing energy web page.

14. The AR system of claim 1, wherein the memory unit has further instructions stored thereon, which when executed by the processing unit cause the AR system to further:

cause display, via the AR display device, of a prompt to create a new energy web page in response to determining that the physical object is not associated with an existing energy web page.

15. A computer-implemented method comprising:

receiving, via a computer network, data regarding a state of an electrical grid from a plurality of devices connected to the edge of the electrical grid, the data gathered in part using sensors at the plurality of devices connected to the edge of the electrical grid;

processing the data to generate a first model of the electrical grid;

enabling access, via the computer network, to information associated with the generated first model of the electrical grid as a cloud-based service;

receiving, via the computer network, imaging data associated with a physical environment;

processing the imaging data to:

identify physical objects associated with the electrical grid in the physical environment;

determine relationships between the identified physical objects based in part on relative locations of the identified physical objects; and generate a second model of the electrical grid based on the locations and determined relationships between the identified physical objects; and enabling access, via the computer network, to information associated with the generated second model of the electrical grid as a cloud-based service.

16. The method of claim 15, wherein one or more of the plurality of devices connected to the edge of the electrical grid include devices associated with one or more distributed energy resources.

17. The method of claim 16, wherein the one or more distributed energy resources include any of a photovoltaic system, a wind turbine system, a fuel cell, a combined heat power system, a battery, or an electrical load that can be controlled for the purposes of energy efficiency or grid or microgrid management.

18. The method of claim 15, wherein one or more of the plurality of devices connected to the edge of the electrical grid are not owned by, or not managed by, or not directly controlled by an energy utility or by an electrical co-op or other grid owner or operator.

19. The method of claim 15, wherein one or more of the plurality of devices connected to the edge of the grid include inverters configured to sense the state of the current and/or voltage and/or other electrical characteristics at a point of connection to the electrical grid.

20. The method of claim 15, wherein one or more of the sensors are configured to sense the electrical state at a point of connection to the electrical grid and/or environmental conditions of the physical environment surrounding the point of connection to the electrical grid.

21. The method of claim 15, wherein the imaging data is in keyhole markup language (KML) format.

22. The method of claim 15, wherein one or more of the identified physical objects include devices connected to an edge of the electrical grid.

23. The method of claim 15, wherein one or more of the identified physical objects include infrastructure associated with the electrical grid.

24. The method of claim 15, wherein the imaging data is received from one or more of:

a map database;

an unmanned aerial vehicle (UAV) with imaging capability;

a satellite with imaging capability; or a user device with imaging capability.

25. The method of claim 15, wherein determining relationships between the identified physical objects is based at least in part on determined types of the identified physical objects.

26. The method of claim 15, further comprising:

processing the generated first model with the generated second model to generate a third model of the electrical grid, the third model associating real-time operating information based on the first model with identified physical objects associated with the electrical grid in the physical environment based on the second model; and enabling access, via the computer network, to information associated with the generated third model of the electrical grid as a cloud-based service.

27. The method of claim 15, wherein enabling access to information associated with the third model includes:

determining that an augmented reality (AR) display device is within a line of sight and/or a threshold proximity with a particular physical object of the identified physical objects associated with the electrical grid in the physical environment;

accessing the third model of the electrical grid for information corresponding to the particular physical object; and causing display, via the AR display device, of a graphical object including a representation of at least some of the accessed information corresponding to the particular physical object, the graphical object displayed via the AR display device so as to partially overlay a view of the physical environment.

28. The method of embodiment 27, wherein the AR display device includes any of a smart phone device, a tablet device, a head mounted display device, a virtual retinal display device, or a heads up display (HUD) device mounted in a vehicle.

29. A method performed by one or more server computers operating as part of an energy grid data platform, the method comprising:

receiving, via a computer network, data regarding a state of an electrical grid from a plurality of devices connected to the edge of the electrical grid that are not owned, operated, managed, or controlled by an energy utility associated with the electrical grid, the data gathered in part using sensors at the plurality of devices connected to the edge of the electrical grid;

receiving, via the computer network, imaging data associated with a physical environment in which the electrical grid resides;

processing the imaging data to identify physical objects associated with the electrical grid in the physical environment; and processing the received data regarding the state of the electrical grid with the identified physical objects associated with the electrical grid to generate an operational model of the electrical grid, the operational model associating real-time operating information based on the received data regarding the state of the electrical grid with the identified physical objects associated with the electrical grid in the physical environment; and enabling access, via the computer network, to information associated with the generated operational model of the electrical grid as a cloud-based service.

30. The method of claim 29, wherein enabling access to information associated with the operational model includes:

determining that an augmented reality (AR) display device is within a line of sight and/or a threshold proximity with a particular physical object of the identified physical objects associated with the electrical grid in the physical environment;

accessing the operational model of the electrical grid for information corresponding to the particular physical object; and causing display, via the AR display device, of a graphical object including a representation of at least some of the accessed information corresponding to the particular physical object, the graphical object displayed via the AR display device so as to partially overlay a view of the physical environment.

* * * * *